US010401596B2

United States Patent
Masui

(10) Patent No.: US 10,401,596 B2
(45) Date of Patent: Sep. 3, 2019

(54) PROJECTION OPTICAL SYSTEM AND PROJECTOR

(71) Applicant: KONICA MINOLTA, INC., Chiyoda-ku (JP)

(72) Inventor: Atsuo Masui, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 134 days.

(21) Appl. No.: 15/353,437

(22) Filed: Nov. 16, 2016

(65) Prior Publication Data
US 2017/0153427 A1 Jun. 1, 2017

(30) Foreign Application Priority Data

Dec. 1, 2015 (JP) .................................. 2015-234638

(51) Int. Cl.
G02B 13/04 (2006.01)
G02B 13/16 (2006.01)
G02B 15/16 (2006.01)
G02B 15/177 (2006.01)
G02B 27/00 (2006.01)

(52) U.S. Cl.
CPC ............ *G02B 13/04* (2013.01); *G02B 13/16* (2013.01); *G02B 15/16* (2013.01); *G02B 15/177* (2013.01); *G02B 27/0025* (2013.01)

(58) Field of Classification Search
CPC .. G02B 13/0045; G02B 13/009; G02B 13/04; G02B 13/06; G02B 13/16; G02B 13/18; G02B 13/22; G02B 15/00; G02B 15/14; G02B 15/16; G02B 15/161; G02B 15/167; G02B 15/177; G02B 15/20; G02B 27/0025; G02B 17/08; G02B 17/0896; G02B 7/04
See application file for complete search history.

(56) References Cited

U.S. PATENT DOCUMENTS

| | | | | |
|---|---|---|---|---|
| 10,048,476 B2* | 8/2018 | Amano | ............... | G02B 17/008 |
| 2013/0229635 A1* | 9/2013 | Lin | ........... | G02B 13/18 |
| | | | | 353/88 |
| 2014/0226217 A1* | 8/2014 | Amano | ............... | G02B 13/16 |
| | | | | 359/680 |
| 2015/0234167 A1* | 8/2015 | Ode | ........ | G02B 13/16 |
| | | | | 359/432 |
| 2016/0246038 A1* | 8/2016 | Amano | ............. | G02B 17/0896 |

FOREIGN PATENT DOCUMENTS

JP 2005-128286 5/2005
JP 2015-060062 3/2015

* cited by examiner

*Primary Examiner* — Stephone B Allen
*Assistant Examiner* — Adam W Booher
(74) *Attorney, Agent, or Firm* — Cozen O'Connor

(57) ABSTRACT

A projection optical system capable of performing magnification projection of an image displayed on an image display surface, with a 40° half angle of view, or more includes, in an order from a magnification side: a first optical system; and a second optical system, wherein the second optical system forms an intermediate image of the image, the first optical system performs magnification projection of the intermediate image, and the following conditional expressions (1) and (2) are satisfied: $1 < Ff/|Fw| < 2$ ... (1), $0.4 < Lf/Lw < 0.6$ ... (2), where, Ff: a focal length of the first optical system, Fw: a focal length of an entire system, Lf: a distance on optical axis, from a most-magnification-side surface vertex to the intermediate image, in the first optical system, Lw: an entire length of a lens.

11 Claims, 19 Drawing Sheets

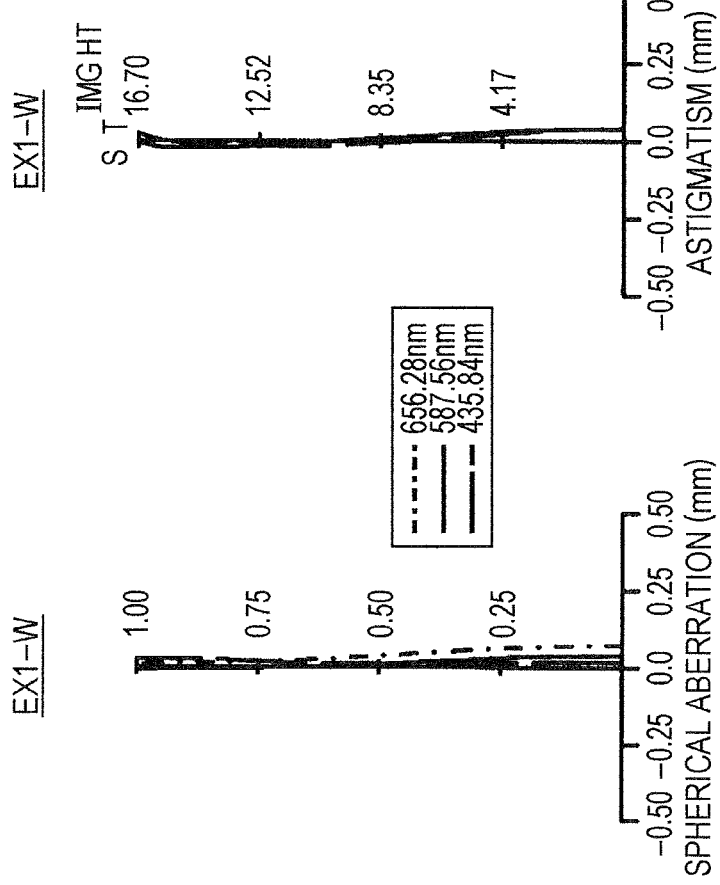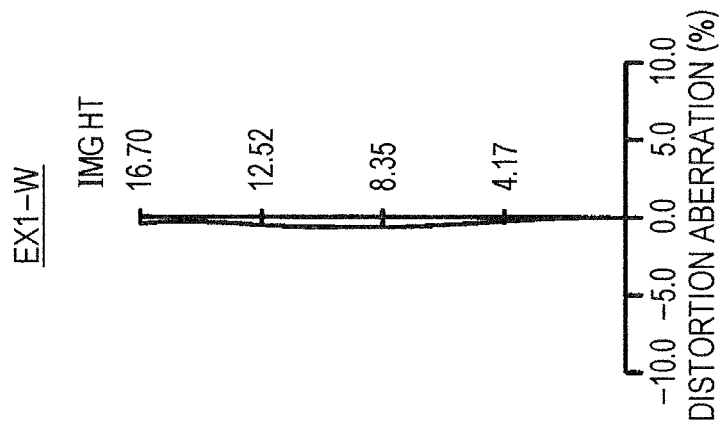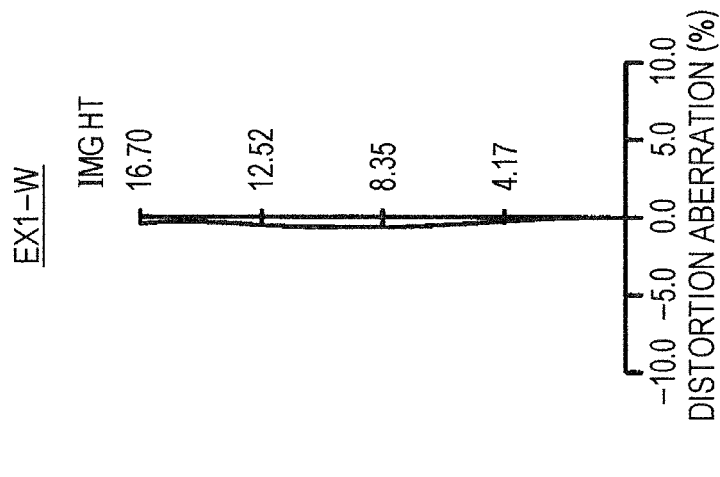

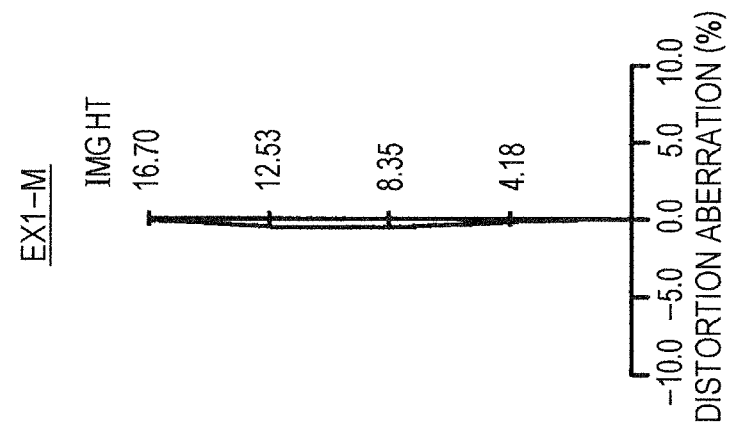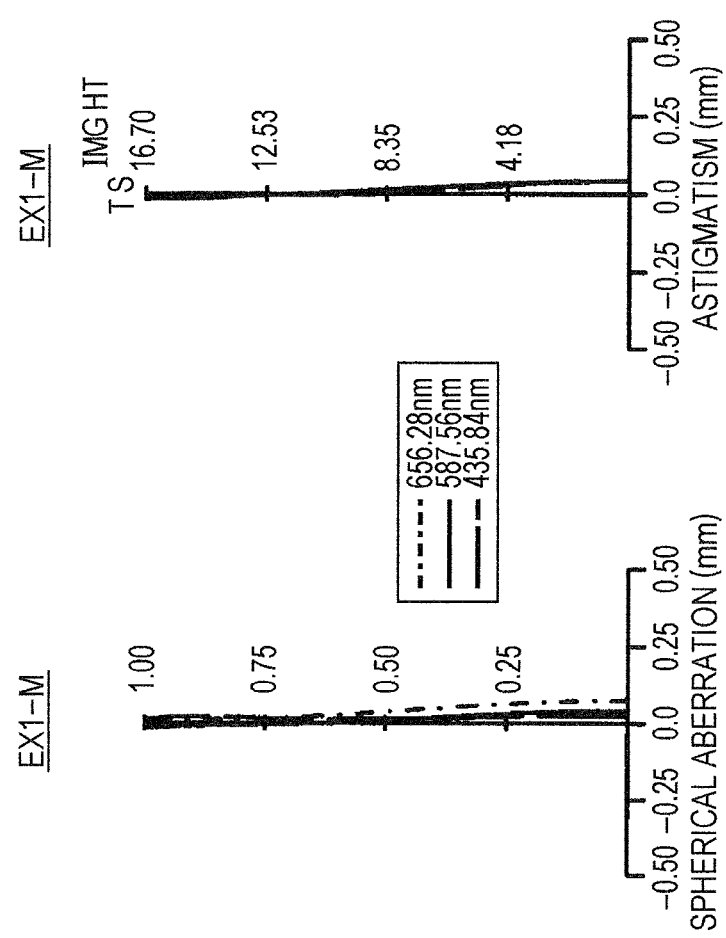

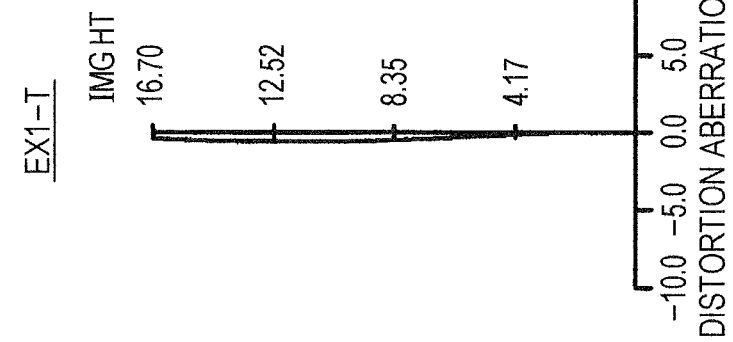
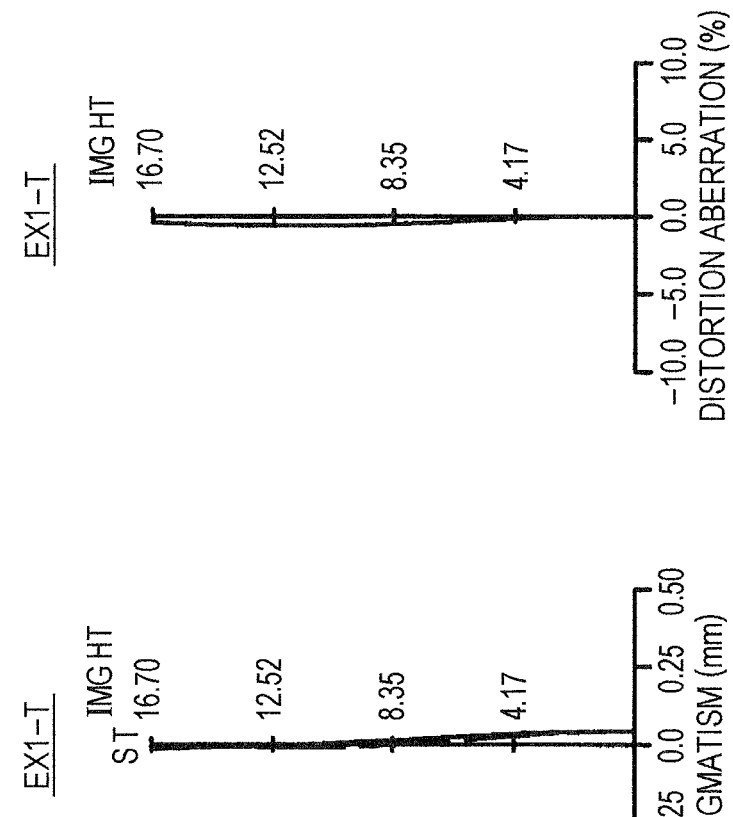
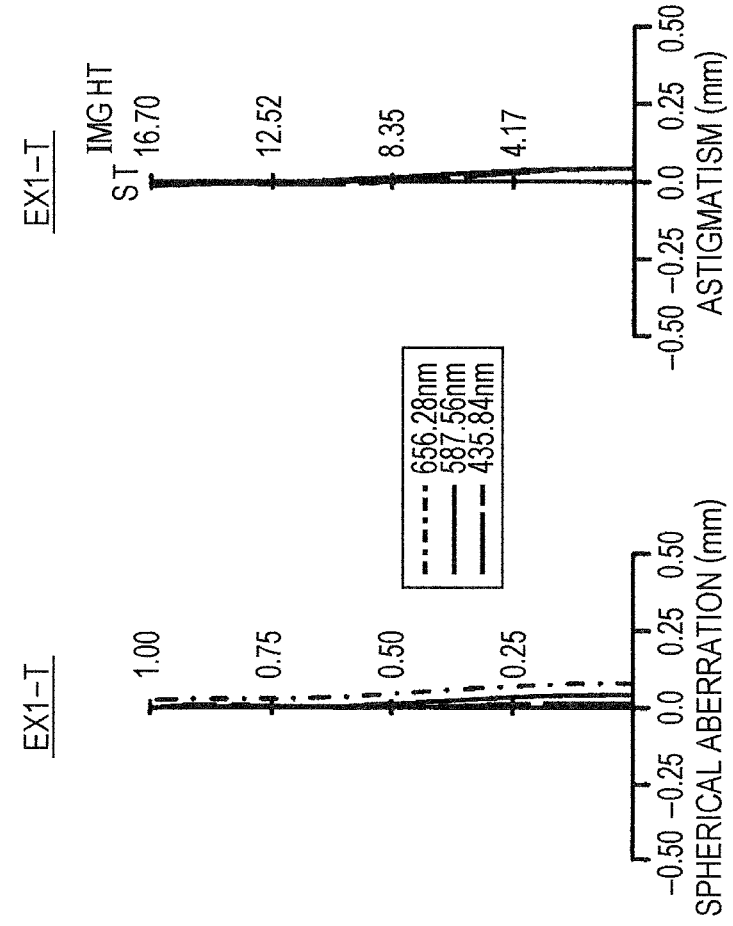

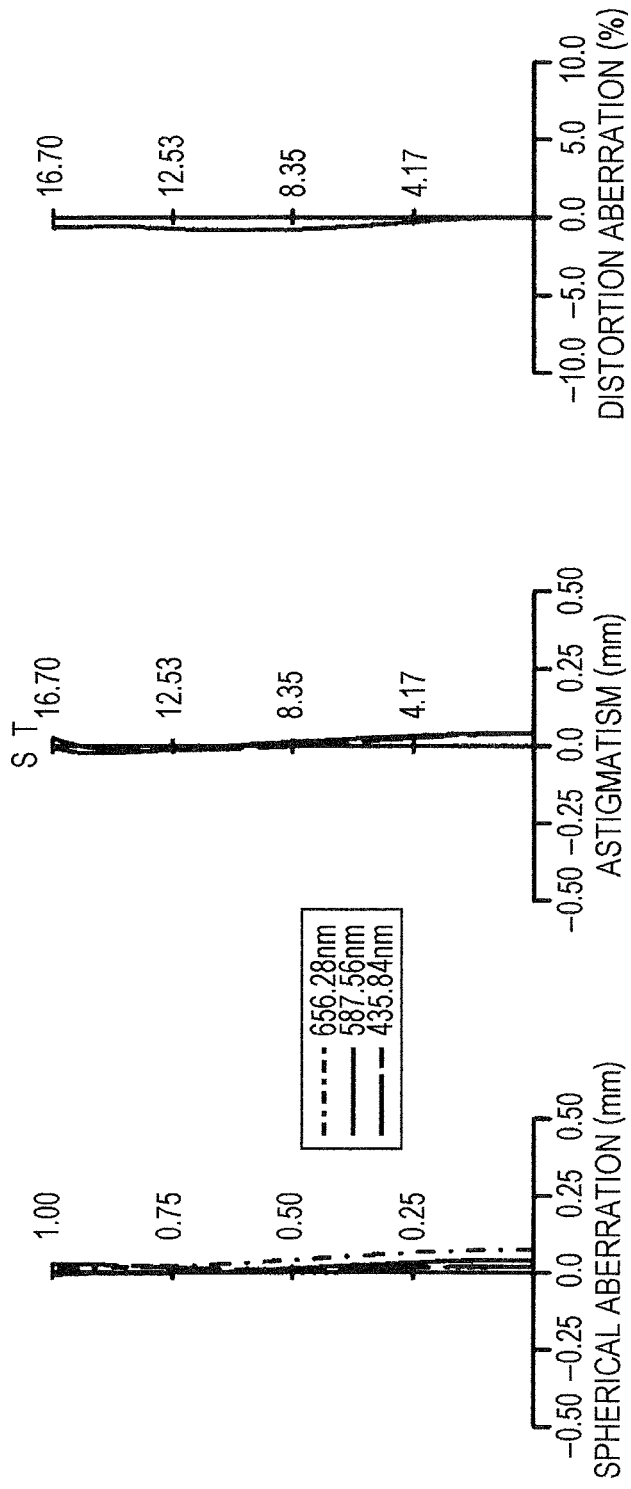
FIG. 7A EX2-W
FIG. 7B EX2-W
FIG. 7C EX2-W

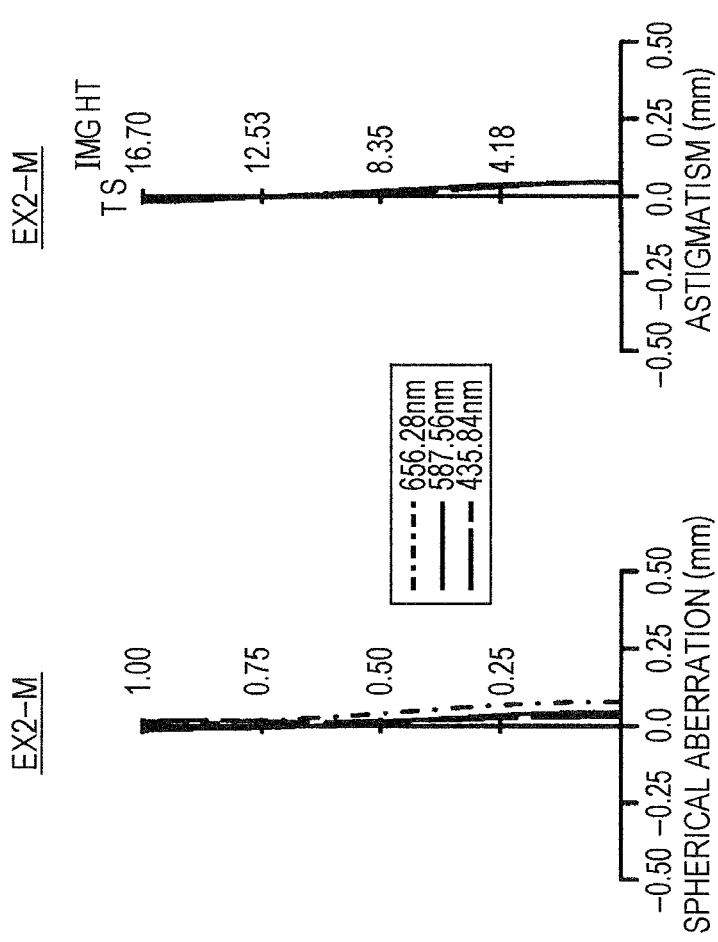

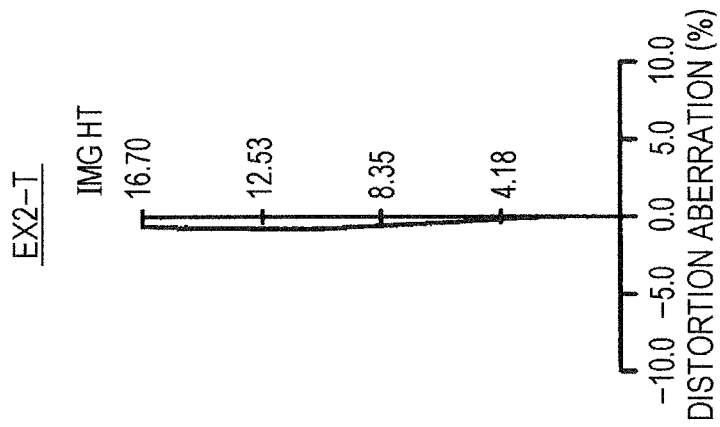
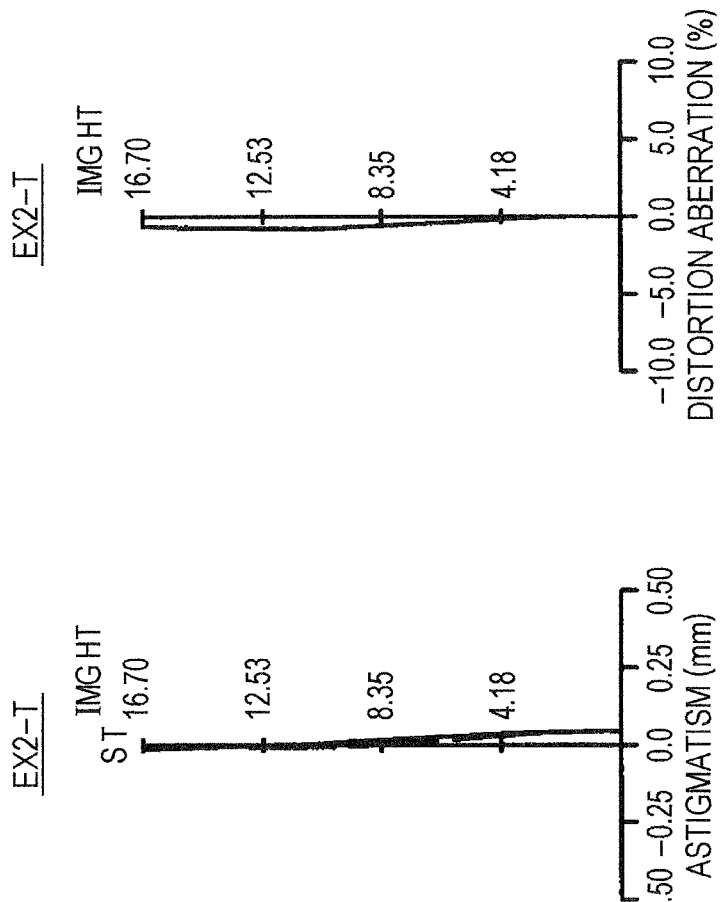
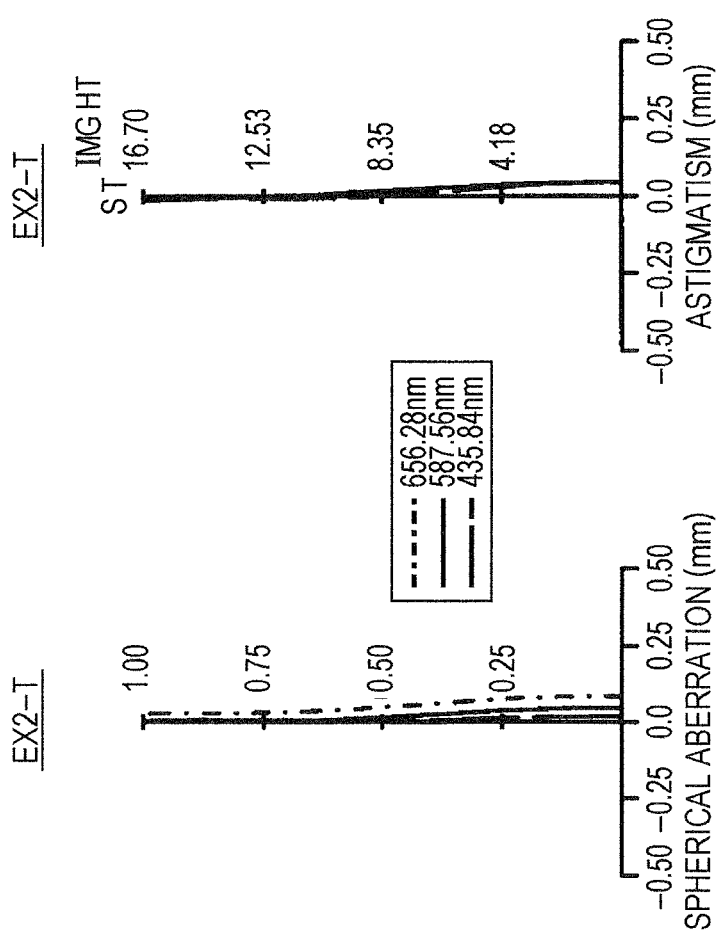

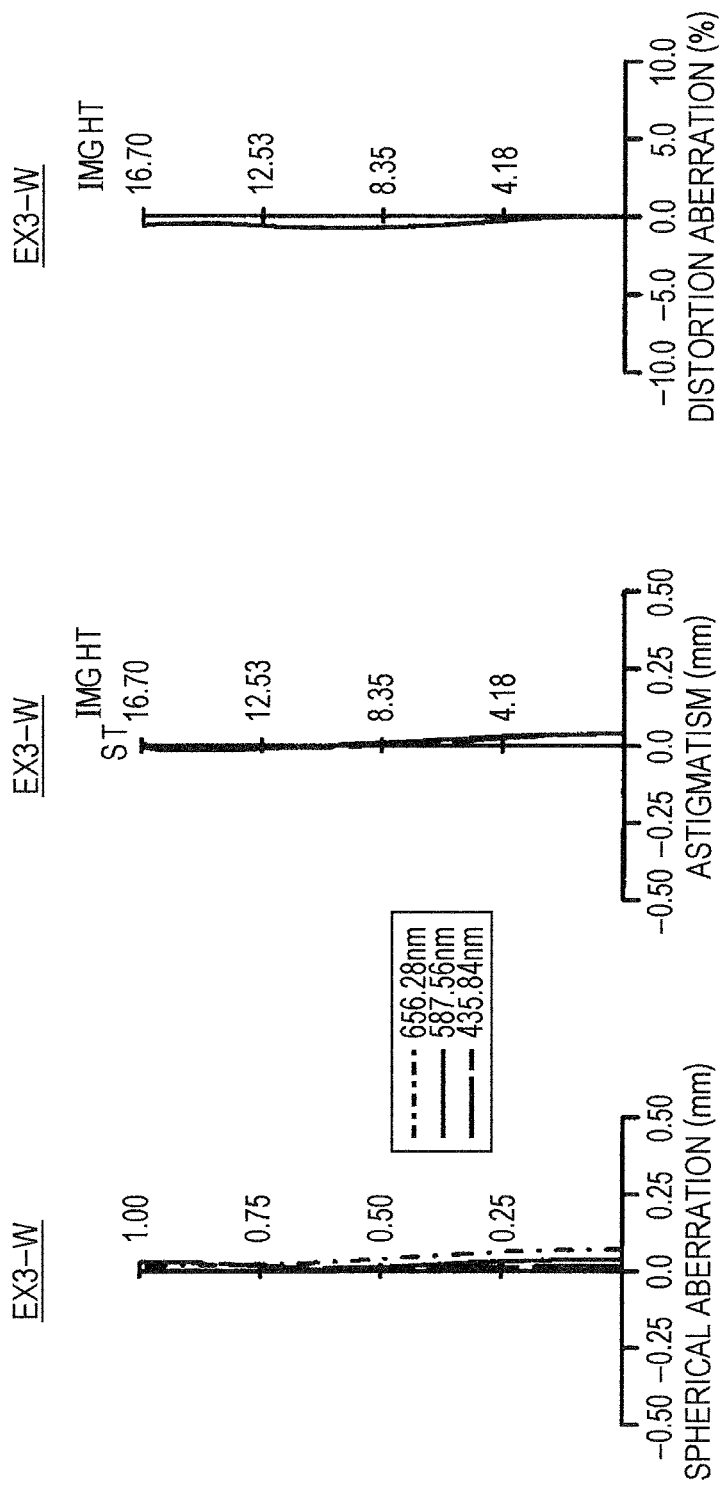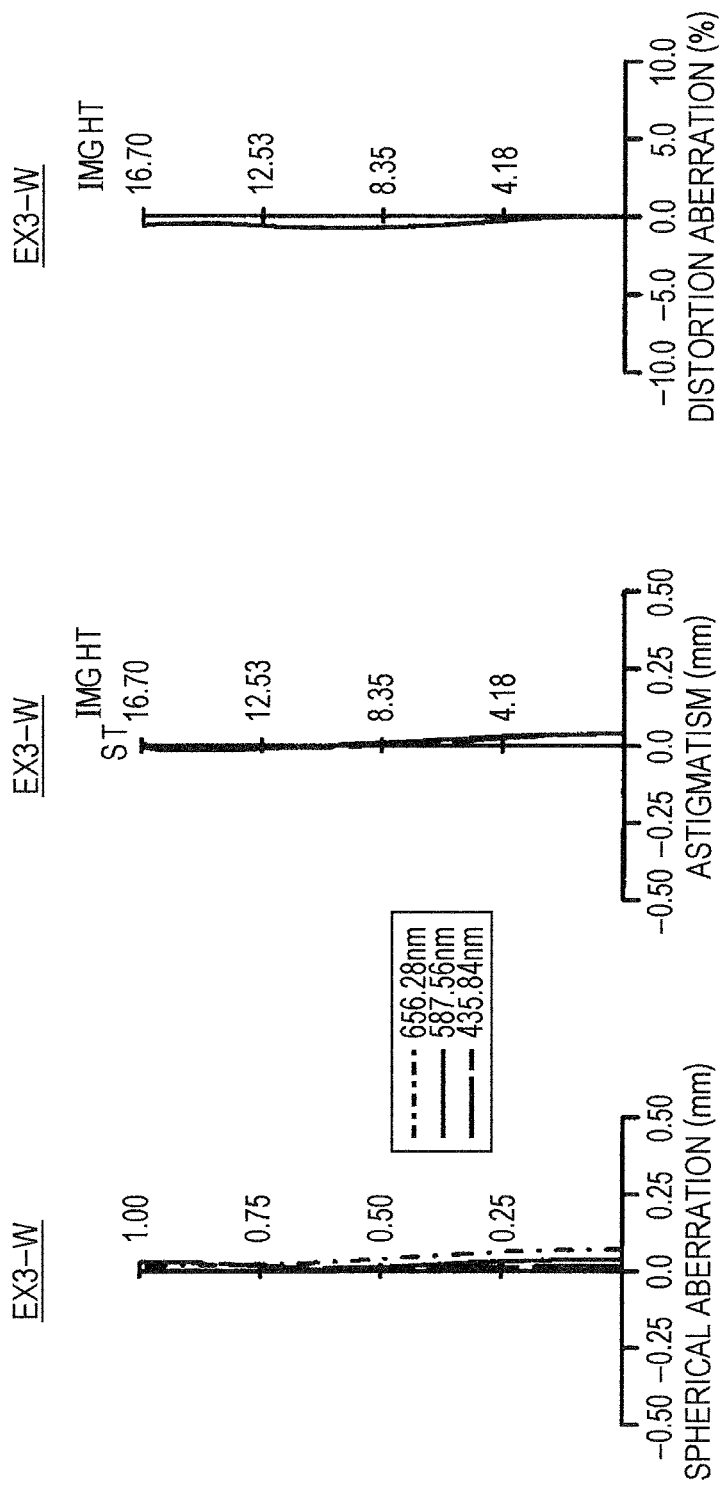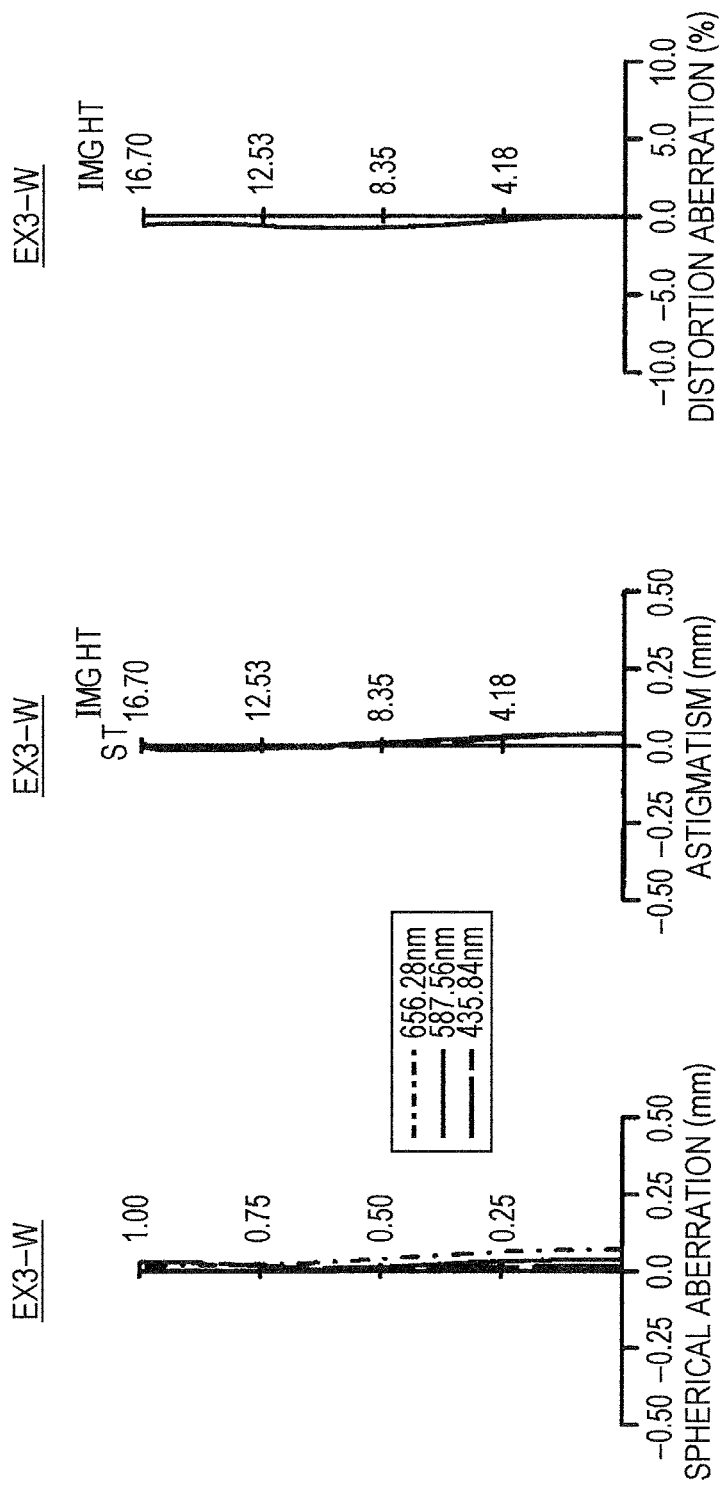

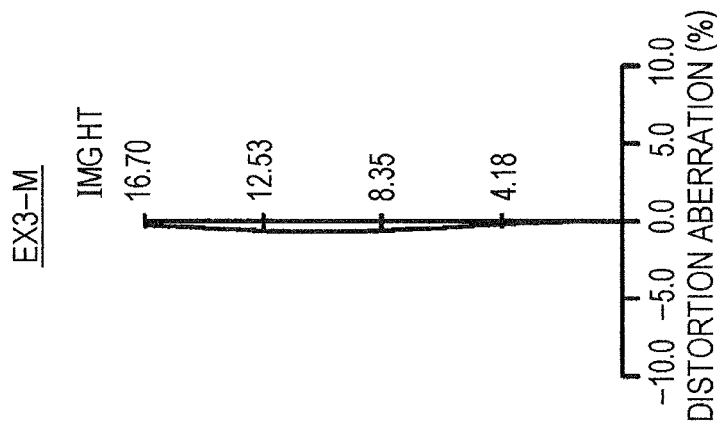
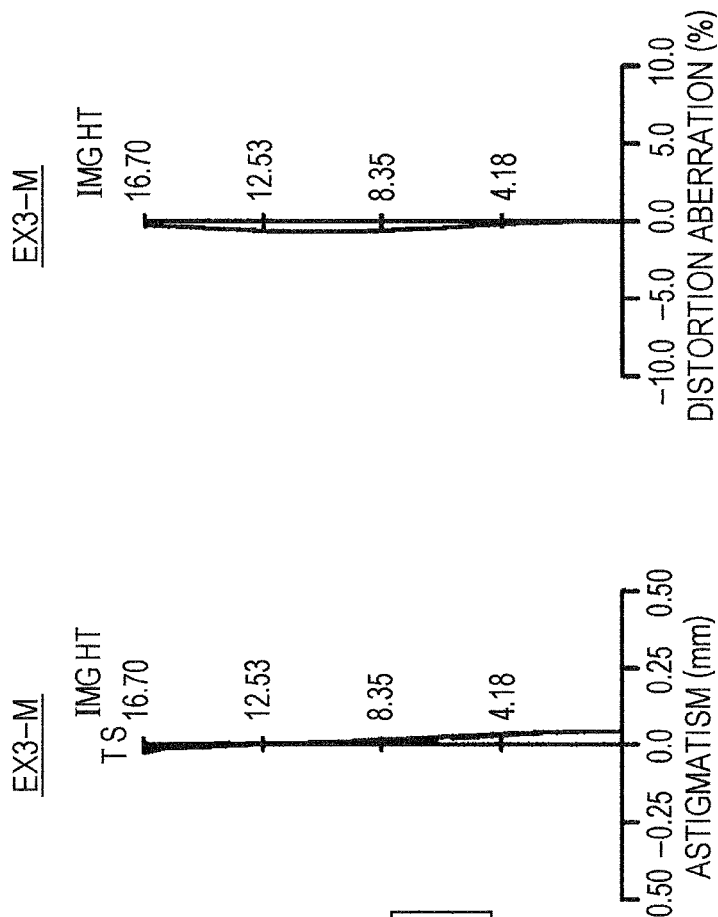
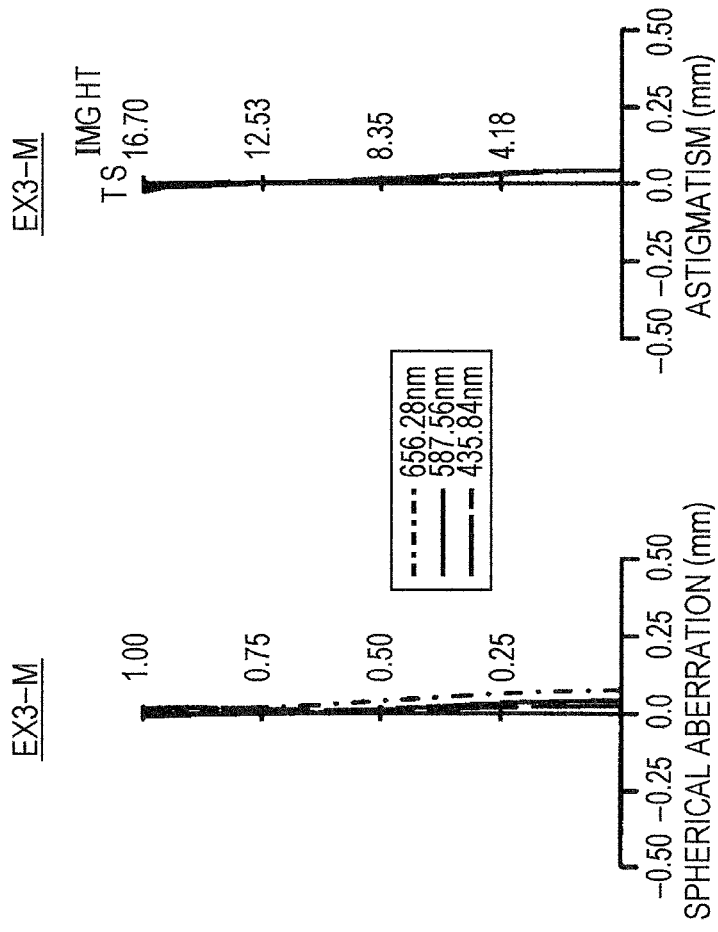

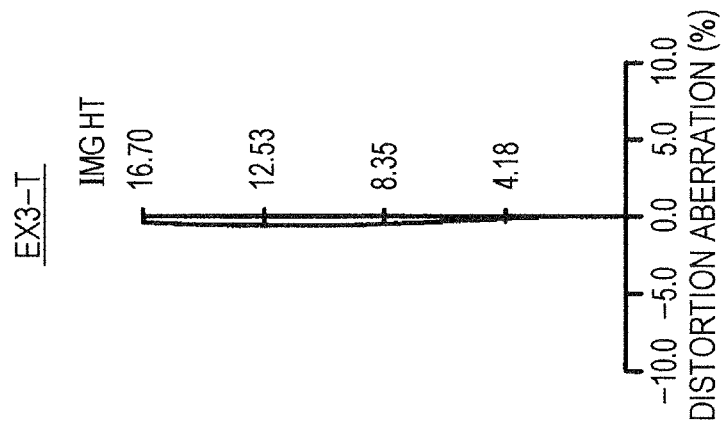
FIG. 8G
EX3-T
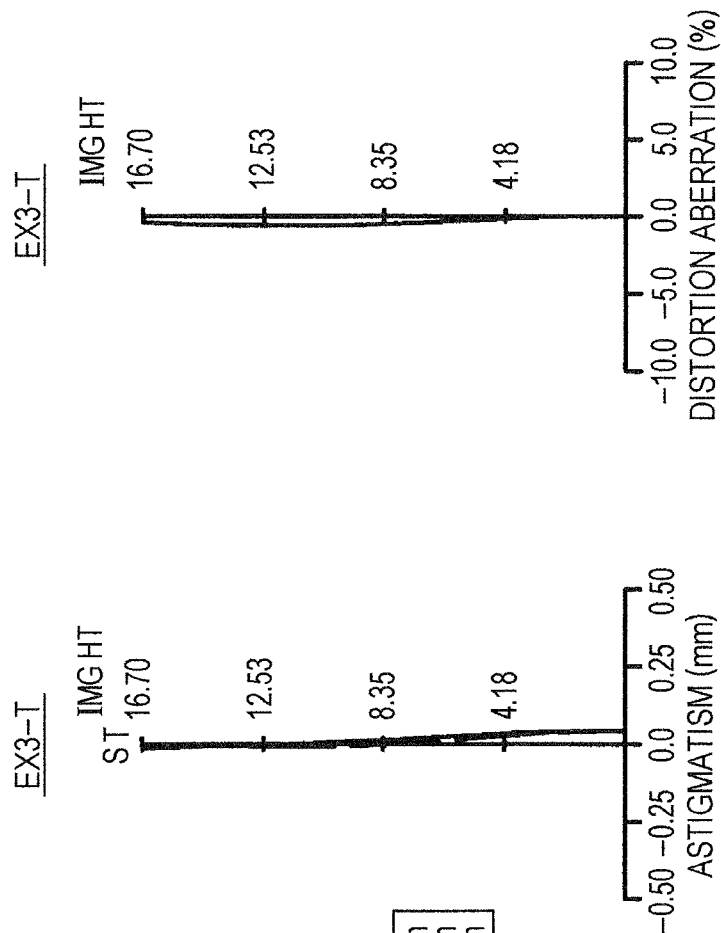
FIG. 8H
EX3-T
FIG. 8I
EX3-T

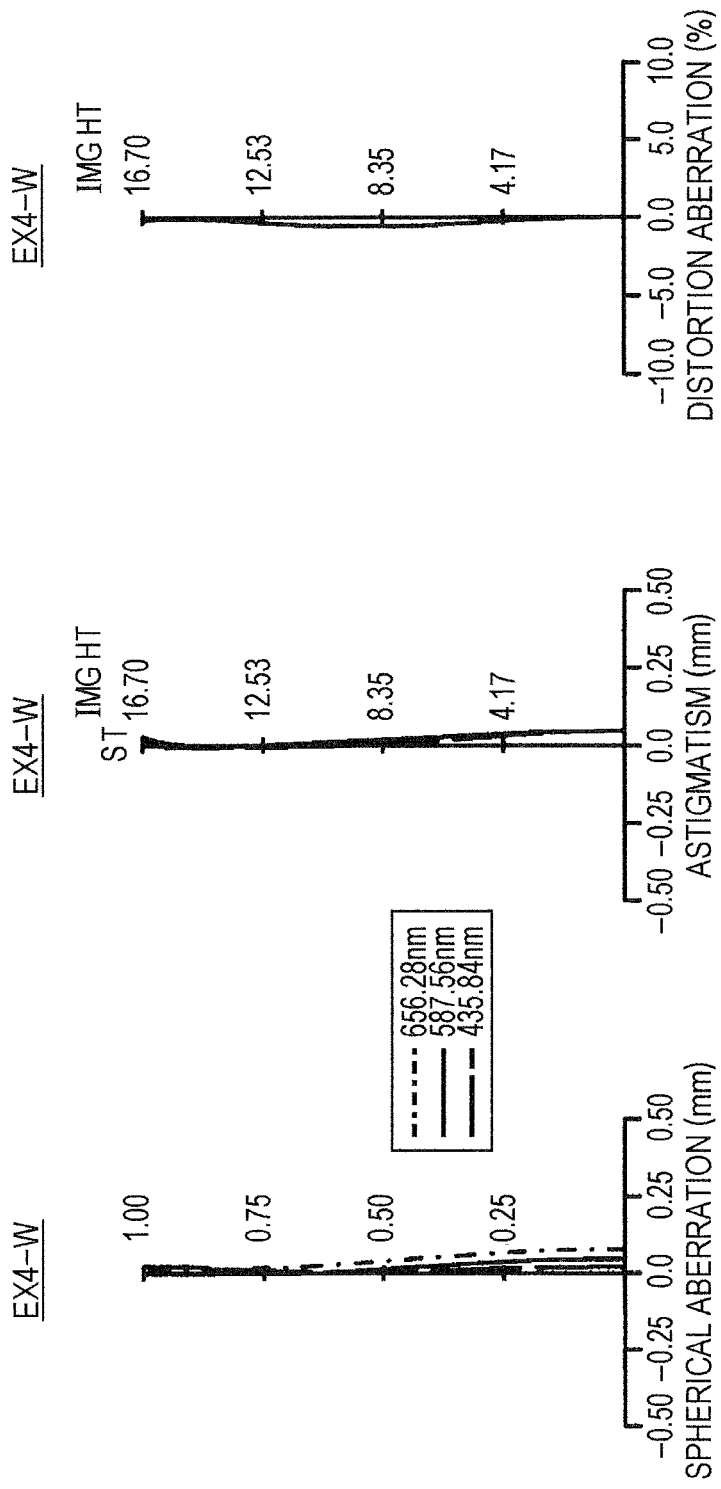

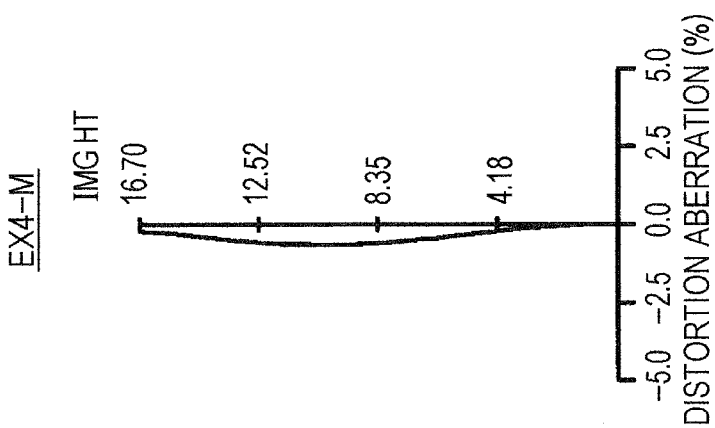
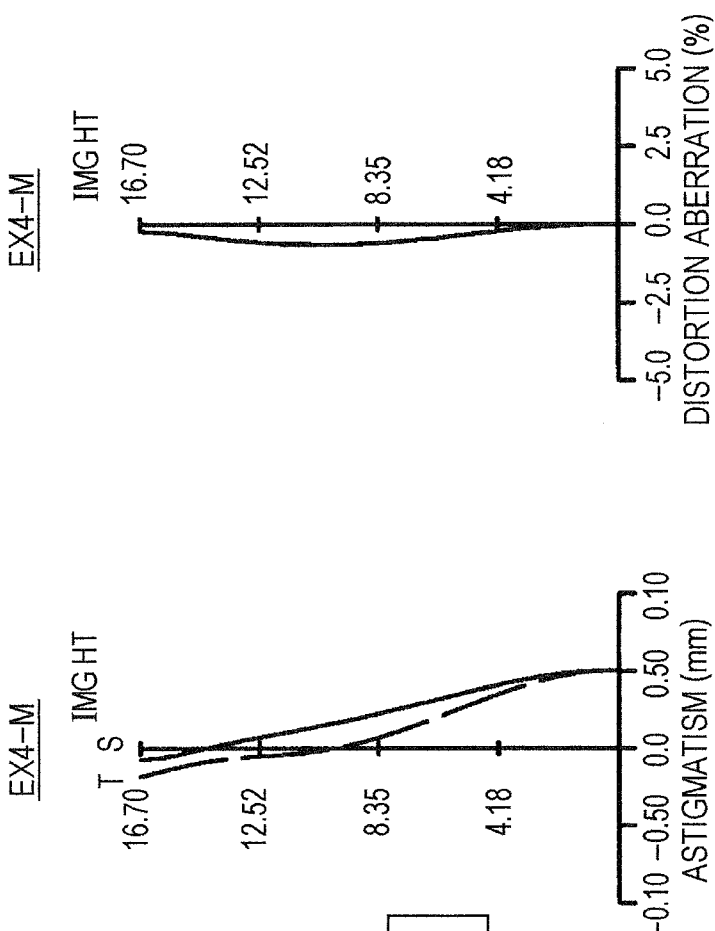
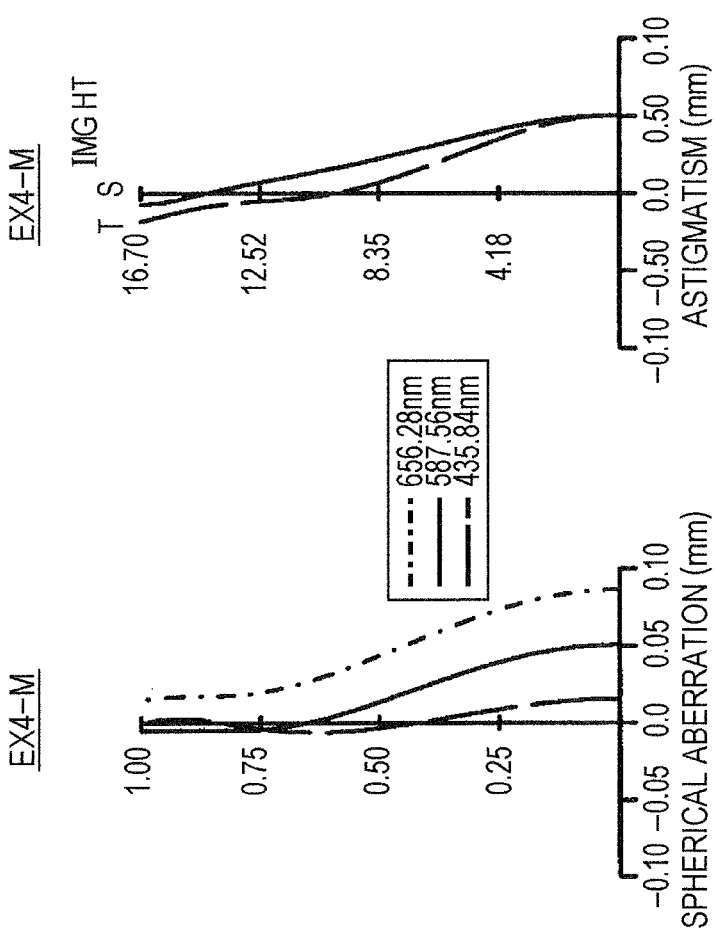

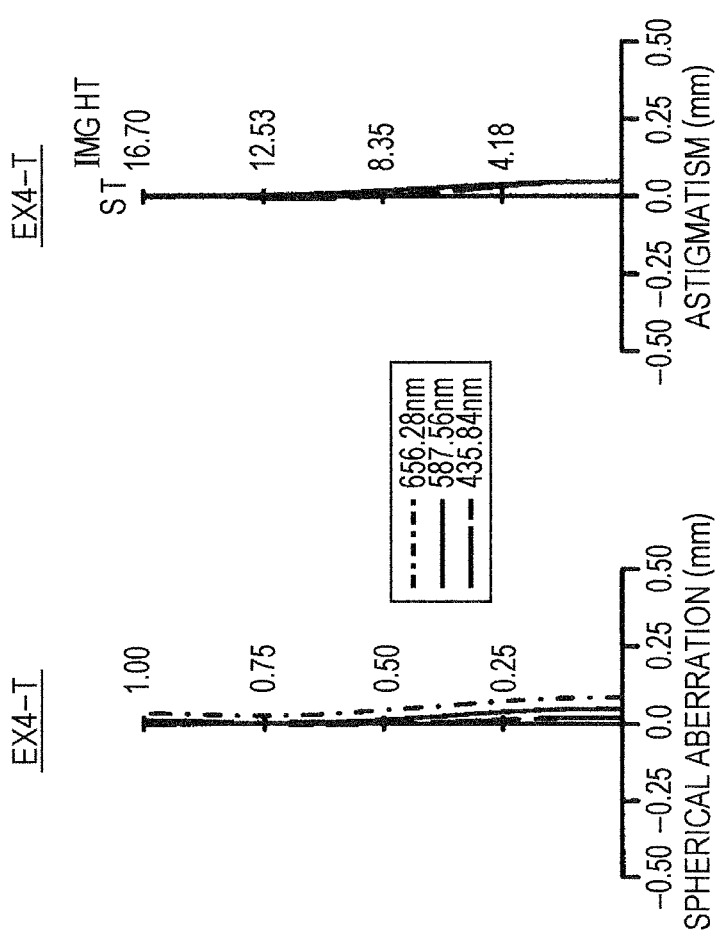

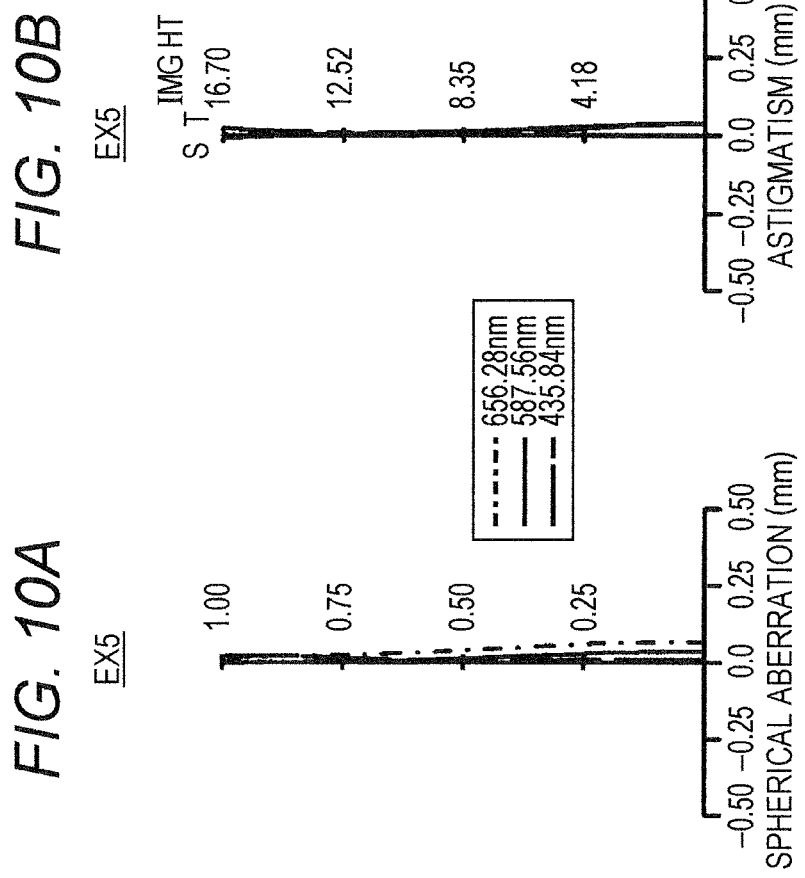

PROJECTION OPTICAL SYSTEM AND PROJECTOR

The entire disclosure of Japanese Patent Application No. 2015-234638 filed on Dec. 1, 2015 including description, claims, drawings, and abstract are incorporated herein by reference in its entirety.

BACKGROUND OF THE INVENTION

Field of the Invention

The present invention relates to a projection optical system and a projector, and specifically relates to a projection optical system suitable for performing magnification projection of an image displayed by image display elements such as a digital micromirror device and a liquid crystal display (LCD), onto a screen with a wide angle of view, and to a projector including the projection optical system.

Description of the Related Art

In recent years, there is a demand for a projection optical system with a wide angle of view, capable of performing projection onto a large screen even in a small space. In order to achieve both the wide angle of view and good aberration-handling performance, the use of a relay lens is effective. A projection optical system using a relay lens for performing projection with a wide angle of view is proposed in JP 2015-060062 A and JP 2005-128286 A.

Even in a case where the relay lens is used, it is difficult to correct off-axis aberration, particularly, distortion aberration. To cope with this, it is necessary to use an aspheric lens in a magnification-side portion having a large lens diameter. This, however, might be a factor of increasing the cost. For example, in a zoom lens described in JP 2015-060062 A, off-axis aberration is properly corrected. However, since an asphere is used as a lens second from the magnification side in the magnification-side portion with a large diameter, this zoom lens attributes to high cost. A zoom lens described in JP 2005-128286 A uses no asphere for the magnification-side portion. However, since off-axis aberration, particularly, distortion aberration is significant, this lens cannot provide sufficient quality for a projection optical system.

SUMMARY OF THE INVENTION

The present invention has been made in view of this situation, and an object thereof is to provide a downsized projection optical system with high performance and low cost, that has a wide angle of view and has off-axis aberration properly corrected, and to provide a projector including such a projection optical system.

To achieve the abovementioned object, according to an aspect, a projection optical system capable of performing magnification projection of an image displayed on an image display surface, with a 40° half angle of view, or more, reflecting one aspect of the present invention comprises, in an order from a magnification side:

a first optical system; and
a second optical system,
wherein the second optical system forms an intermediate image of the image,
the first optical system performs magnification projection of the intermediate image, and
the following conditional expressions (1) and (2) are satisfied:

$$1<Ff/|Fw|<2 \quad (1)$$

$$0.4<Lf/Lw<0.6 \quad (2),$$

where,
Ff: a focal length of the first optical system,
Fw: a focal length of an entire system (focal length of the entire system at a maximum angle of view in a case where the projection optical system is a zoom lens),
Lf: a distance on optical axis, from a most-magnification-side surface vertex to the intermediate image, in the first optical system,
Lw: an entire length of a lens (entire length of the lens, at the maximum angle of view in a case where the projection optical system is a zoom lens).

According to a projection optical system of Item. 2, in the invention of Item. 1, no asphere is preferably included in three lenses beginning from the most-magnification-side of the first optical system.

According to a projection optical system of Item. 3, in the invention of Item. 1 or 2, no asphere is preferably included in the first optical system.

According to a projection optical system of Item. 4, in the invention of any one of Items. 1 to 3, no asphere is preferably included in the system.

According to a projection optical system of Item. 5, in the invention of any one of Items. 1 to 4, the following conditional expression (3) is preferably satisfied:

$$0.8<(Y'/Y)\times\beta 2<1 \quad (3),$$

where,
Y': a chief ray height from an optical axis on an intermediate image position of a most off-axis beam at a maximum angle of view,
Y: a maximum image height on the image display surface,
β2: paraxial magnification of a second optical system at the maximum angle of view (herein, paraxial magnification is defined as [image size at the image display surface]/[intermediate image size].

According to a projection optical system of Item. 6, in the invention of any one of Items. 1 to 5, a most-magnification-side lens of the first optical system is preferably a negative lens.

According to a projection optical system of Item. 7, in the invention of any one of Items. 1 to 6, at least one positive lens preferably exists among three lenses beginning from the most magnification side of the first optical system.

According to a projection optical system of Item. 8, in the invention of anyone of Items. 1 to 7, the first optical system preferably includes a negative lens, a negative lens, a positive lens, and a negative lens, in the order from the magnification side.

According to a projection optical system of Item. 9, in the invention of any one of Items. 1 to 8, magnification change is preferably performed by moving, along the optical axis, a lens group including at least a portion of one of the first and second optical systems.

According to a projection optical system of Item. 10, in the invention of Item. 9, the lens group that moves for magnification change is preferably positioned in the second optical system alone.

To achieve the abovementioned object, according to an aspect, a projector reflecting one aspect of the present invention comprises: an image display element having the image display surface; and the projection optical system of any one of Items. 1 to 10 that performs magnification projection of an image displayed on the image display surface, onto a screen surface.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 6A to 6I are aberration diagrams for Example 1;
FIGS. 7A to 7I are aberration diagrams for Example 2;
FIGS. 8A to 8I are aberration diagrams for Example 3;
FIGS. 9A to 9I are aberration diagrams for Example 4;
FIGS. 10A to 10C are aberration diagrams for Example 5.

DESCRIPTION OF THE PREFERRED EMBODIMENTS

Figure 1:
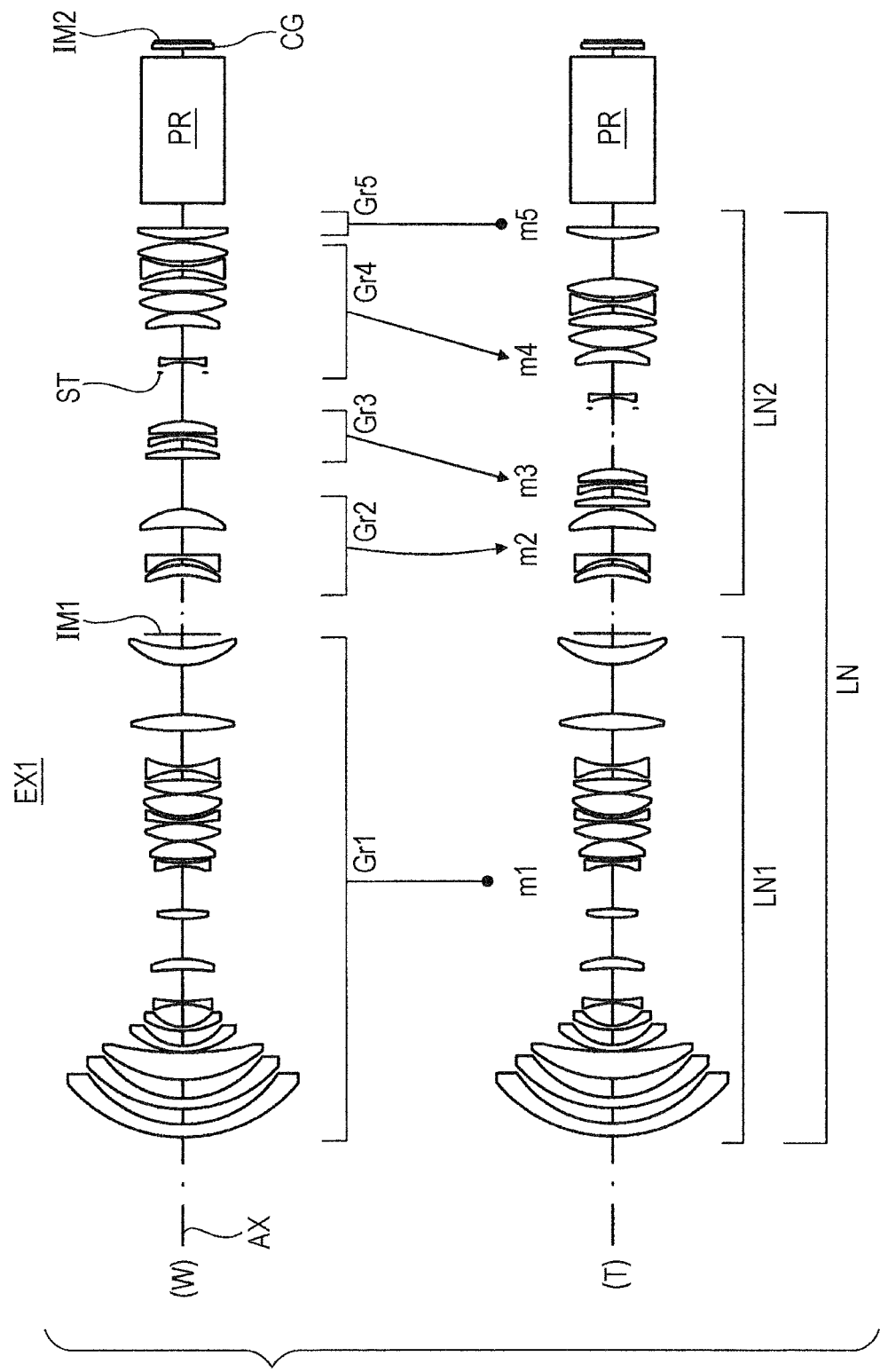
FIG. 1 is an optical configuration diagram according to a first embodiment (Example 1)
Figure 2:
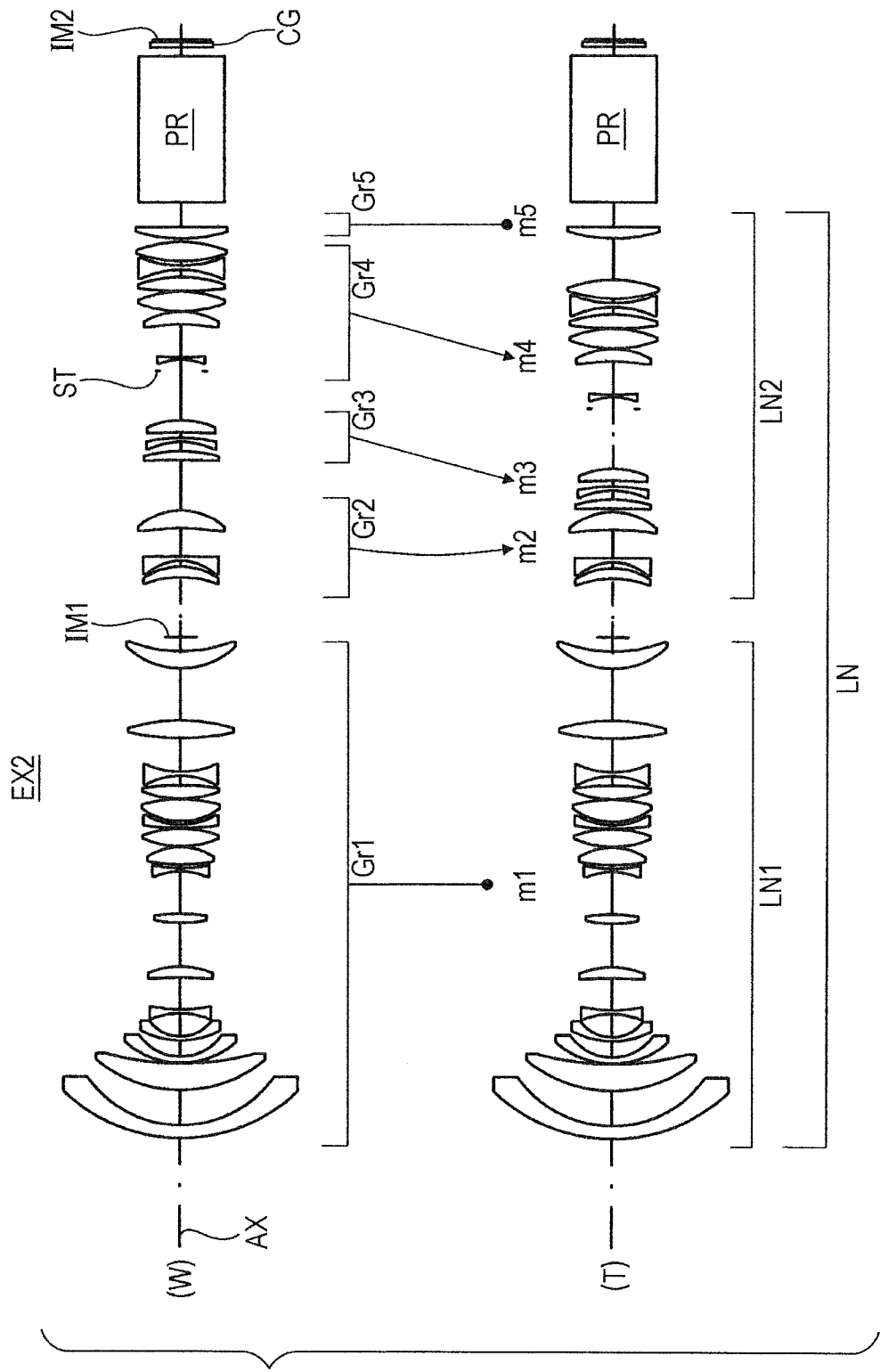
FIG. 2 is an optical configuration diagram according to a second embodiment (Example 2)
Figure 3:
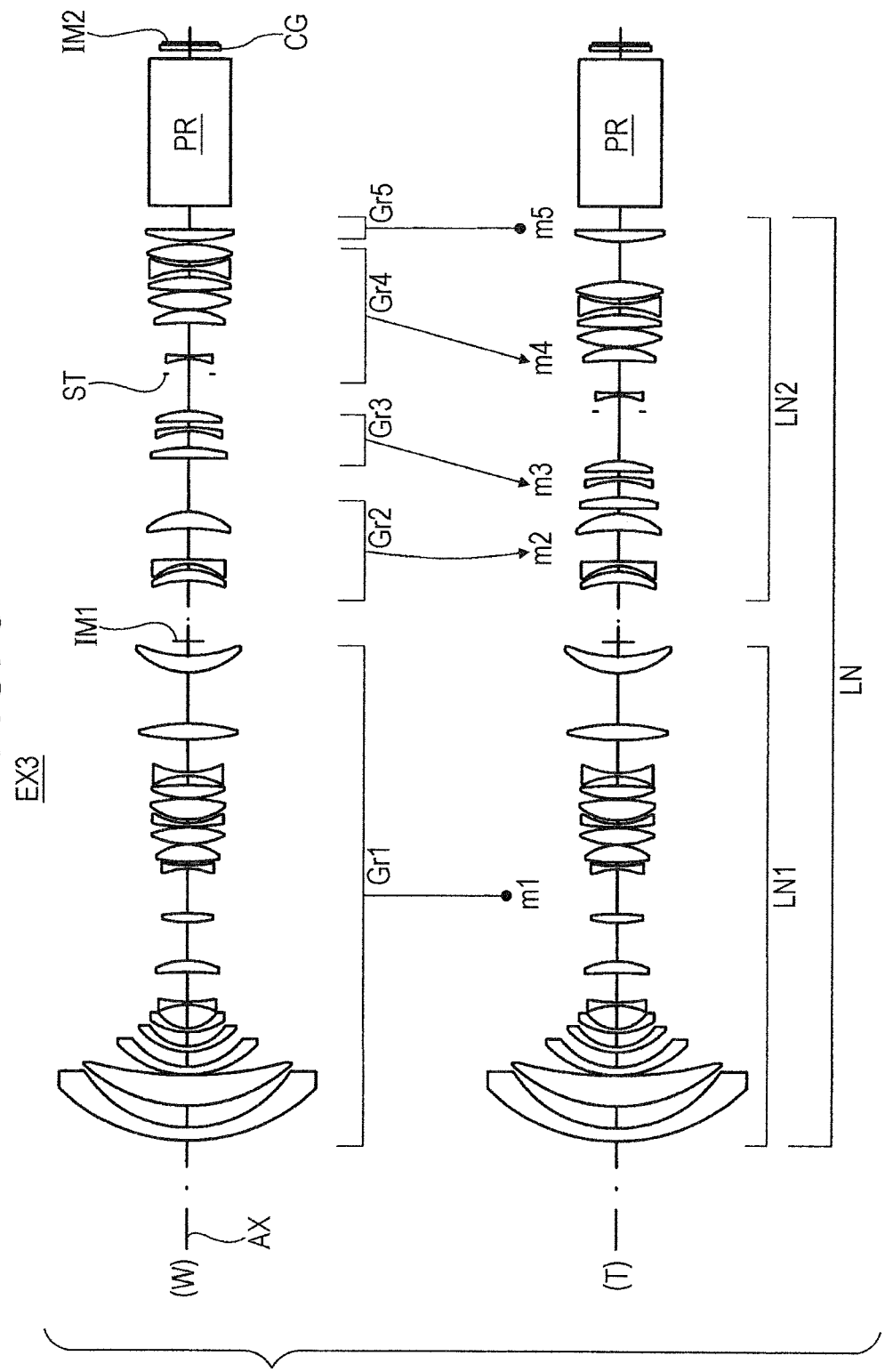
FIG. 3 is an optical configuration diagram according to a third embodiment (Example 3)
Figure 4:
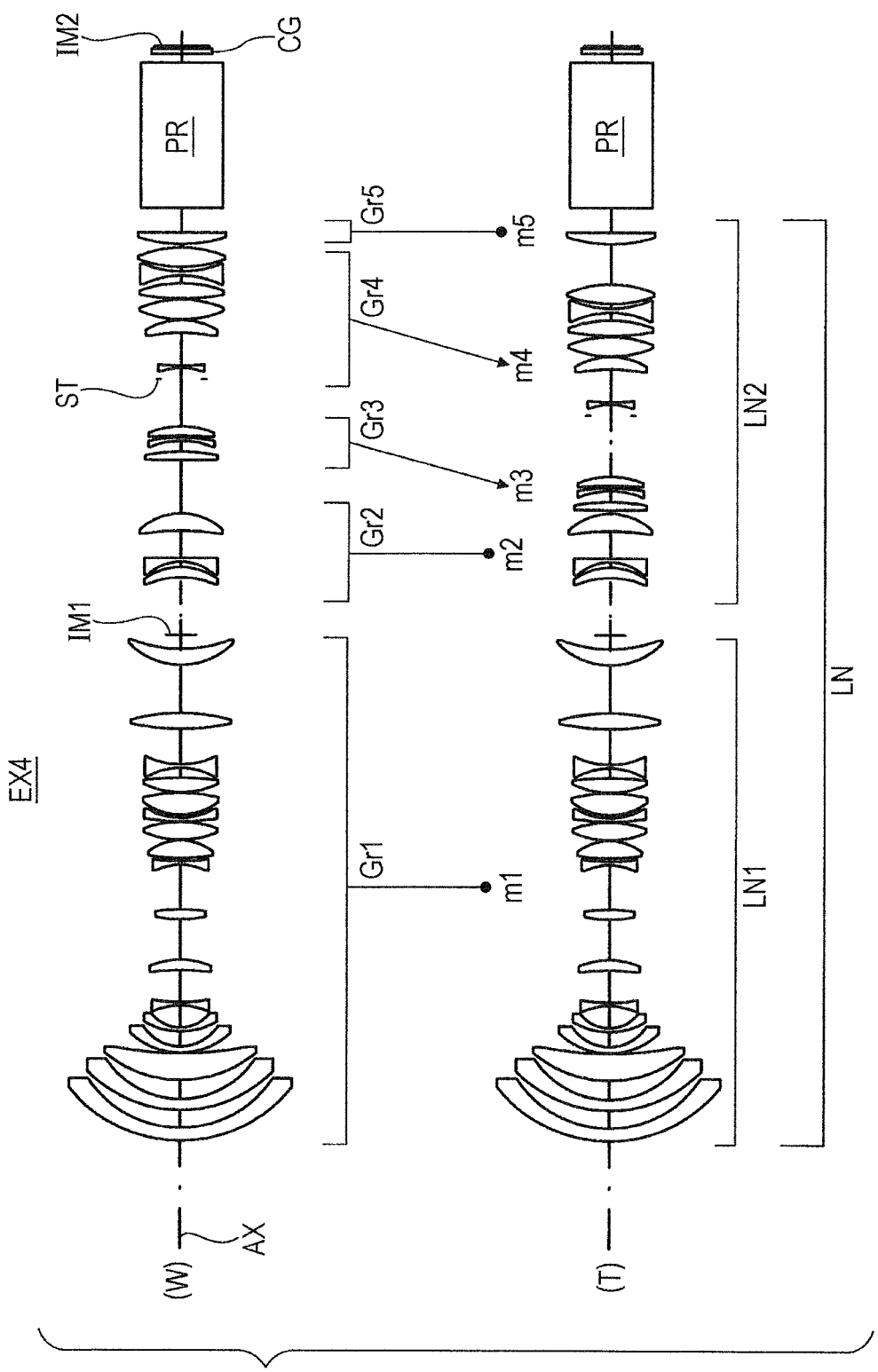
FIG. 4 is an optical configuration diagram according to a fourth embodiment (Example 4)

Hereinafter, a projection optical system, a projector, or the like, according to an embodiment of the present invention will be described with reference to the drawings. However, the scope of the invention is not limited to the illustrated examples. The projection optical system according to an embodiment of the present invention is a projection optical system capable of performing magnification projection of an image displayed on an image display surface, with a 40° half angle of view, or more. The projection optical system includes a first optical system and a second optical system in the order from a magnification side, the second optical system forms an intermediate image of the image, the first optical system performs magnification projection of the intermediate image, and the following conditional expressions (1) and (2) are satisfied:

$$1 < Ff/|Fw| < 2 \quad (1)$$

$$0.4 < Lf/Lw < 0.6 \quad (2),$$

where,

Ff: a focal length of the first optical system,

Fw: a focal length of an entire system (focal length of the entire system at a maximum angle of view in a case where the projection optical system is a zoom lens), Lf: a distance on an optical axis, from a most-magnification-side surface vertex to the intermediate image in the first optical system, and Lw: an entire length of the lens (entire length of the lens at the maximum angle of view in a case where the projection optical system is a zoom lens).

The lens systems constituting the above-described projection optical system include a focal length variable lens system such as a zoom lens, in addition to a single-focus lens. Note that the "magnification side" represents a direction of projecting a magnified optical image onto a screen surface, or the like. The opposite direction is a "reduction side", namely, a direction in which an image display element (e.g. digital micromirror device) that displays an original optical image (i.e., reduction-side image surface) is arranged.

Conditional expression (1) defines refractive power of the first optical system that performs magnification projection of the intermediate image in a wide-angle projection optical system including the second optical system as a relay lens. When an upper limit of conditional expression (1) is exceeded, the focal length of the first optical system becomes too long. Accordingly, it would be necessary to increase the size of the intermediate image in order to achieve a wide angle of view, and thus, the lens diameter in the vicinity of the intermediate image would increase. On the other hand, in order to achieve a wide angle of view in a state where the focal length of the first optical system is extended, it would be necessary to shorten the focal length of the second optical system. To achieve this, it would be necessary to increase negative refractive power on the intermediate image side of the second optical system. In this case, negative distortion occurs in the second optical system and this amplifies the negative-side distortion occurring in the first optical system that performs magnification projection, making it difficult to suppress distortion aberration in the entire system. When a lower limit of conditional expression (1) is exceeded, it would be difficult to correct off-axis aberration, particularly distortion, occurring in the first optical system. Therefore, by satisfying this conditional expression (1), it is possible to effectively suppress off-axis aberration such as distortion while achieving downsizing of the lens diameter.

Conditional expression (2) defines an entire length of the first optical system that performs magnification projection of the intermediate image in a wide-angle projection optical system including the second optical system as a relay lens. When the upper limit of the conditional expression (2) is exceeded, the entire length of the first optical system becomes too long. This would increase the number of lenses in the first optical system, that are likely to have large diameters because of magnification projection, and thus, increase the cost. Moreover, since the entire length of the second optical system becomes short with respect to the first optical system, the number of lenses in the second optical system becomes insufficient, leading to an increase in aberration, particularly field curvature, at an intermediate image. This would make it difficult to obtain good aberration-handling performance in the entire system. When the lower limit of conditional expression (2) is exceeded, the number of lenses needed to achieve a wide angle of view would be insufficient and the refractive power for each of the lenses becomes great, making it difficult to correct off-axis aberration. Therefore, by satisfying this conditional expression (2), it is possible to effectively suppress off-axis aberration such as field curvature while achieving downsizing of the entire length.

Typically, producing an aspherical glass lens with a large diameter is technically difficult and likely to be a factor of increasing the cost. An aspherical plastic lens with a large diameter is likely to change its shape due to the temperature and to be a factor of deterioration of performance. Accordingly, an asphere is not suitable for a projector lens that tends to have a large diameter and high temperature, and thus, it is preferable that the projection optical system does not include any asphere. In this respect, the setting that would enable high performance and a wide angle of view of the projection optical system even without using any asphere is the condition setting defined in the above-described conditional expressions (1) and (2).

In a projection optical system having the above-described characteristic configuration, it is configured such that an intermediate image is formed in the second optical system and that the focal length and the intermediate image position of the first optical system are properly set. Accordingly, it possible to properly correct off-axis aberration including distortion aberration without using any asphere even with a wide angle of view. As a result, it is possible to provide a downsized projection optical system with high performance and low cost, having off-axis aberration properly corrected, even with a wide angle of view. Applying the projection optical system to a projector, it is possible to contribute to achieving high performance, high functionality, downsizing, or the like, of the projector. Conditions, or the like, needed to obtain these effects with good balance and to achieve high optical performance and downsizing will be described below.

It would be further preferable to satisfy the following conditional expression (1a).

$$1.3 < Ff/|Fw| < 1.7 \tag{1a}$$

Conditional expression (1a) defines a further preferable conditional range based on the viewpoint, or the like, among the conditional ranges defined by the conditional expression (1). Accordingly, by satisfying conditional expression (1a), it would preferably be possible to further enhance the above-described effects.

It would be further preferable to satisfy the following conditional expression (2a).

$$0.4 < Lf/Lw < 0.5 \tag{2a}$$

Conditional expression (2a) defines a further preferable conditional range based on the viewpoint, or the like, among the conditional ranges defined by the conditional expression (2). Accordingly, by satisfying conditional expression (2a), it would preferably be possible to further enhance the above-described effects.

The projection optical system is preferably configured so as not to include any asphere in three lenses beginning from the most-magnification side of the first optical system. With this configuration, it is possible to achieve equivalent distortion-handling performance without using any asphere for correction of distortion, and to reduce the manufacturing cost of a first optical system's magnification-side lens, that is likely to increase its diameter, making it possible to further reduce the cost.

The projection optical system is preferably configured so as not to include any asphere in the first optical system. With this configuration, it is possible achieve equivalent aberration-handling performance without using any asphere for correction of field curvature and spherical aberration, and to reduce the manufacturing cost of the entire first optical system that is likely to increase its diameter, making it possible to further reduce the cost.

The projection optical system is preferably configured so as not to include any asphere. With this configuration, it is possible to achieve equivalent aberration-handling performance without using any asphere for correction of aberration in the intermediate image, and to reduce the manufacturing cost of the entire projection optical system, making it possible to further reduce the cost.

It would be preferable to satisfy the following conditional expression (3).

$$0.8 < (Y'/Y) \times \beta 2 < 1 \tag{3}$$

where,

Y': a chief ray height from the optical axis on an intermediate image position of the most off-axis beam at a maximum angle of view, Y: a maximum image height on the image display surface, β2: paraxial magnification of the second optical system at the maximum angle of view (herein, paraxial magnification is defined as [image size at the image display surface]/[intermediate image size].

Conditional expression (3) defines the ratio of maximum real image height (Y') to a maximum paraxial image height (Y/β2), of the intermediate image, that is, defines a distortion amount of the second optical system. When the lower limit of conditional expression (3) is exceeded, positive-side distortion that occurs in the second optical system is too large and thus, the real intermediate image becomes too small. Since this would increase the refractive power of the first optical system in order to perform magnification projection of the image, it would be difficult to suppress off-axis aberration that occurs in the first optical system. When the upper limit of conditional expression (3) is exceeded, negative-side distortion occurs in the second optical system and this amplifies the negative-side distortion occurring in the first optical system that performs magnification projection, making it difficult to suppress distortion. Therefore, by satisfying this conditional expression (3), it is possible to suppress, with good balance, off-axis aberration such as distortion aberration.

It would be further preferable to satisfy the following conditional expression (3a).

$$0.9 < (Y'/Y) \times \beta 2 < 1 \tag{3a}$$

Conditional expression (3a) defines a further preferable conditional range based on the viewpoint, or the like, among the conditional ranges defined by the conditional expression (3). Accordingly, by satisfying conditional expression (3a), it would preferably be possible to further enhance the above-described effects.

A most-magnification-side lens in the first optical system is preferably a negative lens. With this configuration, it is possible to reduce the diameter of the most-magnification-side lens with the largest diameter, and thus, to further reduce the cost.

It is preferable that at least one positive lens exists among three lenses beginning from the most magnification side of the first optical system. With this configuration, it is possible to cancel out the negative-side distortion that occurs in the first optical system by using a positive lens as a lens close to the magnification side that is effective for distortion correction. Accordingly, it is possible to obtain still better off-axis performance.

It is preferable that the first optical system includes a negative lens, a negative lens, a positive lens, and a negative lens, in the order from the magnification side. With this refractive power arrangement of negative-negative-positive-negative, it is possible to reduce the most-magnification-side lens diameter, and to suppress distortion aberration further effectively.

It is preferable to perform magnification change by moving, along the optical axis, a lens group including at least a portion of one of the first and second optical systems. With this configuration, it is possible to perform projection onto a large screen with good performance even in a case with a spatial restriction or locational restriction for installation.

It is preferable that the lens group that moves for magnification change is positioned in the second optical system alone. With this configuration, it is possible, at magnification change, to fix the first optical system in which off-axis aberration is likely to occur, and to further reduce occurrence of off-axis aberration at magnification change.

Figure 5:
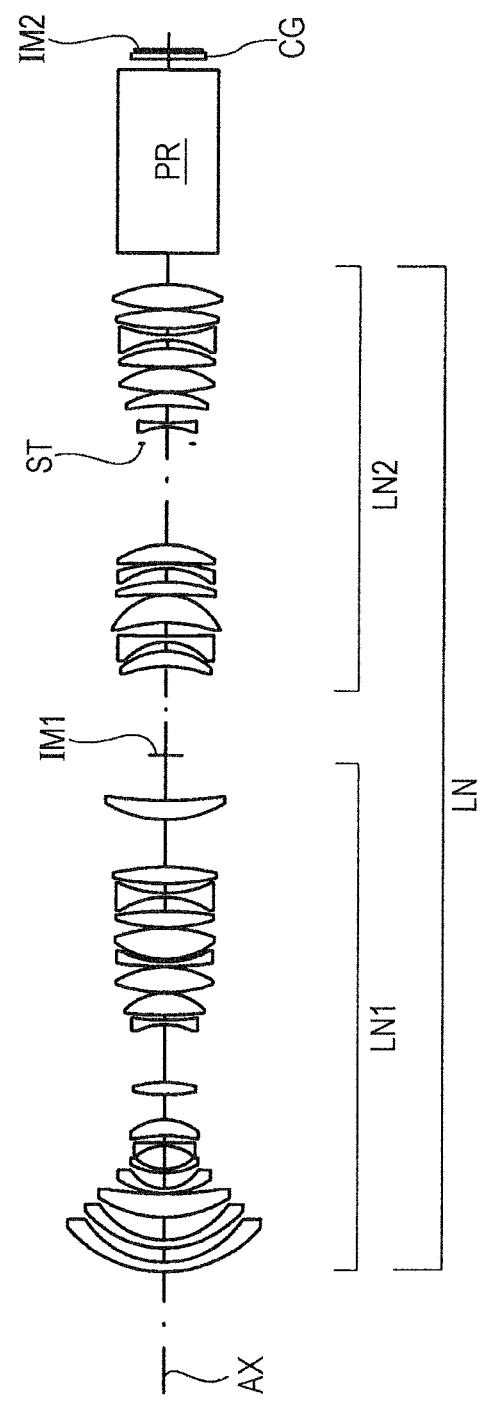
FIG. 5 is an optical configuration diagram according to a fifth embodiment (Example 5)

Next, a specific optical configuration of a projection optical system LN will be described according to first to fifth embodiments. Each of FIGS. 1 to 4 is an optical configuration diagram each corresponding to the projection optical system LN constituting each of the first to fourth embodiments. Each of the diagrams illustrates lens sectional shapes, lens arrangement, or the like, of the projection optical system LN as a zoom lens, in optical cross sections, for each of a wide angle end (W) and a telephoto end (T). FIG. 5 is an optical configuration diagram corresponding to the projection optical system LN constituting the fifth embodiment. The diagram illustrates lens sectional shapes, lens arrangement, or the like, of the projection optical system LN as a single-focus lens, in optical cross sections. At positions on the reduction side of the projection optical system LN, there are a prism PR (for example, TIR (Total Internal Reflection) prism, and color separating/combining prism), and a cover slip CG of the image display element.

The projection optical system LN according to each of the first and fifth embodiments is configured to include a first optical system LN1 (from a first surface to a position just before a surface of an intermediate image IM1) and a second optical system LN2 (from a position just after the surface of the intermediate image IM1 to a last lens surface), in the order from the magnification side. The intermediate image IM1 of the image (reduction-side image surface) displayed on an image display surface IM2 of the image display element is formed by the second optical system LN2, and magnification projection of the intermediate image IM1 is performed by the first optical system LN1. Among these, the projection optical system LN according to the first to fourth embodiments employs a five-group zoom configuration of positive-positive-positive-positive-positive with the first optical system LN1 being defined as a first lens group Gr1. Each of arrows m1, m2, m3, m4, and m5 in FIGS. 1 to 4 schematically illustrates a moving or fixed state of the first lens group Gr1, a second lens group Gr2, a third lens group Gr3, a fourth lens group Gr4, and a fifth lens group Gr5, respectively, in zooming from the wide angle end (W) to the telephoto end (T). In this manner, in the first to fourth embodiments, the projection optical system LN moves a moving group relative to the image display surface IM2 so as to change an interval between individual groups on axis, thereby performing magnification change (namely, zooming) from the wide angle end (W) to the telephoto end (T). Note that in the first to fourth embodiments, a zoom position of the prism PR and cover slip CG, positioned on the reduction side of the fifth lens group Gr5, is fixed.

In the first to third embodiments, each of the first lens group Gr1 and the fifth lens group Gr5 corresponds to a fixed group, each of the second lens group Gr2, the third lens group Gr3, and the fourth lens group Gr4 corresponds to a moving group. In these embodiment, zooming is performed by moving the second lens group Gr2, the third lens group Gr3, and the fourth lens group Gr4, along the optical axis AX. In the fourth embodiment, each of the first lens group Gr1 the second lens group Gr2, and the fifth lens group Gr5 corresponds to the fixed group, each of the third lens group Gr3, and the fourth lens group Gr4 corresponds to the moving group. Zooming is performed by moving the third lens group Gr3, and the fourth lens group Gr4, along the optical axis AX (substantially, four-group zooming configuration). In any case, since the zoom position of the first lens group Gr1 and the fifth lens group Gr5 is fixed, it is possible to suppress a change in the entire length of the optical system, due to a magnification change, and to simplify a magnification change mechanism because the number of moving components decreases. Hereinafter, the projection optical system LN of individual embodiments will be described in more detail.

The first embodiment (FIG. 1) includes 30 lens components in total. Among these, 17 lenses on the magnification side correspond to the first optical system LN1 that performs magnification projection of the intermediate image IM1, and 13 lenses on the reduction side correspond to the second optical system LN2 that forms the intermediate image IM1. The first optical system LN1 is formed with the first lens group Gr1 that is positive as a whole. The second optical system LN2 is formed with the second lens group Gr2 to the fifth lens group Gr5 arranged in positive-positive-positive-positive in the order from the magnification side. Magnification change is performed in the second optical system LN2 alone. At magnification change, the first lens group Gr1 and the fifth lens group Gr5 are fixed, the second lens group Gr2 moves in a magnification-side convex locus in the magnification change from the wide angle end (W) to the telephoto end (T), and each of the third lens group Gr3 and the fourth lens group Gr4 moves monotonically to the magnification side, respectively. Note that the fourth lens group Gr4 includes an aperture stop ST at the most magnification side.

The intermediate image IM1, formed by the second optical system LN2, is a magnification image of the image display surface IM2. With this configuration, it is possible to reduce the refractive power of the first optical system LN1, achieving height optical performance without any asphere. The first optical system LN1 arranges in the order from the magnification side, a negative meniscus lens with its convex toward the magnification side, a negative meniscus lens with its convex toward the magnification side, a positive meniscus lens with its convex toward the magnification side, and a negative meniscus lens with its convex toward the magnification side. With this arrangement, it is possible to effectively suppress distortion aberration even without any asphere. Accordingly, it is possible to achieve a wide-angle projection zoom lens with low cost and high performance.

The second embodiment (FIG. 2) includes 29 lens components in total. Among these, 16 lenses on the magnification side correspond to the first optical system LN1 that performs magnification projection of the intermediate image IM1, and 13 lenses on the reduction side correspond to the second optical system LN2 that forms the intermediate image IM1. The first optical system LN1 is formed with the first lens group Gr1 that is positive as a whole. The second optical system LN2 is formed with the second lens group Gr2 to the fifth lens group Gr5 arranged in positive-positive-positive-positive in the order from the magnification side. Magnification change is performed in the second optical system LN2 alone. At magnification change, the first lens group Gr1 and the fifth lens group Gr5 are fixed, the second lens group Gr2 moves in a magnification-side convex locus in the magnification change from the wide angle end (W) to the telephoto end (T), and each of the third lens group Gr3 and the fourth lens group Gr4 moves monotonically to the magnification side, respectively. Note that the fourth lens group Gr4 includes an aperture stop ST at the most magnification side.

The intermediate image IM1, formed by the second optical system LN2, is a magnification image of the image display surface IM2. With this configuration, it is possible to reduce the refractive power of the first optical system LN1, achieving height optical performance without any asphere. The first optical system LN1 arranges in the order from the magnification side, a negative meniscus lens with its convex toward the magnification side, a positive meniscus lens with its convex toward the magnification side, and a negative meniscus lens with its convex toward the magnification side. With this arrangement, it is possible to effectively suppress distortion aberration even without any asphere. Accordingly, it is possible to achieve a wide-angle projection zoom lens with low cost and high performance.

The third embodiment (FIG. 3) includes 30 lens components in total. Among these, 17 lenses on the magnification side correspond to the first optical system LN1 that performs magnification projection of the intermediate image IM1, and 13 lenses on the reduction side correspond to the second optical system LN2 that forms the intermediate image IM1. The first optical system LN1 is formed with the first lens group Gr1 that is positive as a whole. The second optical system LN2 is formed with the second lens group Gr2 to the fifth lens group Gr5 arranged in positive-positive-positive-positive in the order from the magnification side. Magnification change is performed in the second optical system LN2 alone. At magnification change, the first lens group Gr1 and the fifth lens group Gr5 are fixed, the second lens group Gr2 moves in a magnification-side convex locus in the magnification change from the wide angle end (W) to the telephoto end (T), and each of the third lens group Gr3 and the fourth lens group Gr4 moves monotonically to the magnification side, respectively. Note that the fourth lens group Gr4 includes an aperture stop ST at the most magnification side.

The intermediate image IM1, formed by the second optical system LN2, is a magnification image of the image display surface IM2. With this configuration, it is possible to reduce the refractive power of the first optical system LN1, achieving height optical performance without any asphere. The first optical system LN1 arranges in the order from the magnification side, a negative meniscus lens with its convex toward the magnification side, a positive meniscus lens with its convex toward the magnification side, and a negative meniscus lens with its convex toward the magnification side. With this arrangement, it is possible to effectively suppress distortion aberration even without any asphere. Accordingly, it is possible to achieve a wide-angle projection zoom lens with low cost and high performance.

The fourth embodiment (FIG. 4) includes 30 lens components in total. Among these, 17 lenses on the magnification side correspond to the first optical system LN1 that performs magnification projection of the intermediate image IM1, and 13 lenses on the reduction side correspond to the second optical system LN2 that forms the intermediate image IM1. The first optical system LN1 is formed with the first lens group Gr1 that is positive as a whole. The second optical system LN2 is formed with the second lens group Gr2 to the fifth lens group Gr5 arranged in positive-positive-positive-positive in the order from the magnification side. Magnification change is performed in the second optical system LN2 alone. At magnification change, the first lens group Gr1, the second lens group Gr2, and the fifth lens group Gr5 are fixed, and each of the third lens group Gr3 and the fourth lens group Gr4 moves monotonically to the magnification side, respectively in magnification change from the wide angle end (W) to the telephoto end (T). Note that the fourth lens group Gr4 includes an aperture stop ST at the most magnification side.

The intermediate image IM1, formed by the second optical system LN2, is a magnification image of the image display surface IM2. With this configuration, it is possible to reduce the refractive power of the first optical system LN1, achieving height optical performance without any asphere. The first optical system LN1 arranges in the order from the magnification side, a negative meniscus lens with its convex toward the magnification side, a negative meniscus lens with its convex toward the magnification side, a positive meniscus lens with its convex toward the magnification side, and a negative meniscus lens with its convex toward the magnification side. With this arrangement, it is possible to effectively suppress distortion aberration even without any asphere. Accordingly, it is possible to achieve a wide-angle projection zoom lens with low cost and high performance.

The fifth embodiment (FIG. 5) includes 30 lens components in total. Among these, 17 lenses on the magnification side correspond to the first optical system LN1 that performs magnification projection of the intermediate image IM1, and 13 lenses on the reduction side correspond to the second optical system LN2 that forms the intermediate image IM1. The first optical system LN1 and the second optical system LN2 constitutes a positive single-focus lens as a whole. Note that the second optical system LN2 includes an aperture stop ST at a position close to the reduction side of the largest air gap.

The intermediate image IM1, formed by the second optical system LN2, is a magnification image of the image display surface IM2. With this configuration, it is possible to reduce the refractive power of the first optical system LN1, achieving height optical performance without any asphere. The first optical system LN1 arranges in the order from the magnification side, a negative meniscus lens with its convex toward the magnification side, a negative meniscus lens with its convex toward the magnification side, a positive meniscus lens with its convex toward the magnification side, and a negative meniscus lens with its convex toward the magnification side. With this arrangement, it is possible to effectively suppress distortion aberration even without any asphere. Accordingly, it is possible to achieve a wide-angle projection optical system with low cost and high performance.

Figure 11:
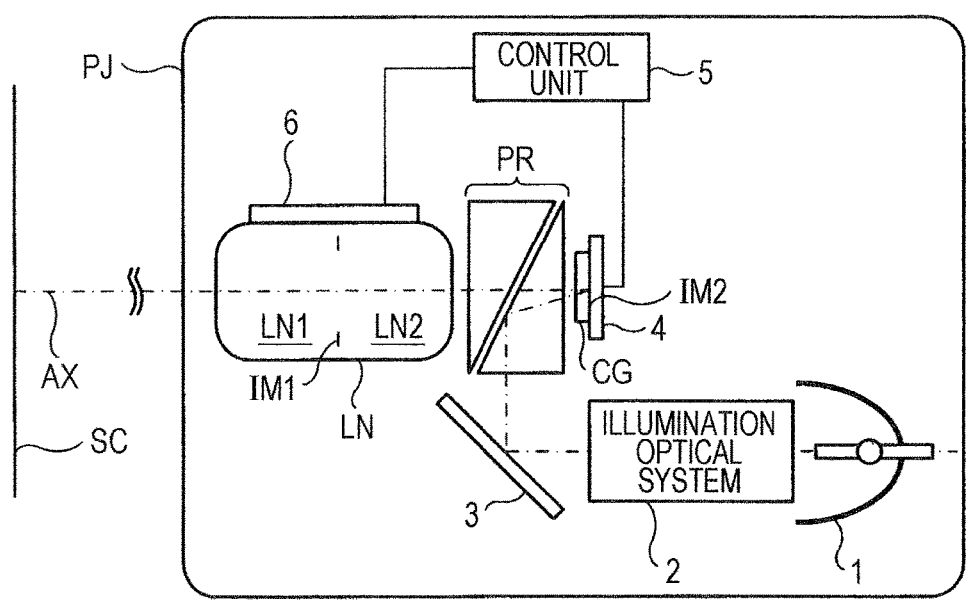
FIG. 11 is a schematic diagram illustrating an embodiment of a projector.

Hereinafter, an embodiment of a projector including the above-described projection optical system LN will be described. FIG. 11 is an exemplary schematic configuration of a projector PJ. The projector PJ includes a light source 1, an illumination optical system 2, a reflection mirror 3, a prism PR, an image display element (image forming element) 4, a control unit 5, an actuator 6, and the projection optical system LN. The control unit 5 is a portion that controls the entire projector PJ. The image display element 4 is an image modulation element (for example, digital micromirror device) that forms an image by modulating light, and includes the image display surface IM2 on which the image is displayed. On the image display surface IM2, a cover slip CG is provided. The light emitted from the light source 1 (for example, white light source such as xenon lamp, and a laser light source) is guided through the illumination optical system 2, the reflection mirror 3, and the prism PR, toward the image display element 4. On the image display element 4, image light is formed. The prism PR is formed with, for example, a TIR prism (or a color splitting/combining prism, etc.), and performs separation of illumination light and projection light from each other, or the like. The image light formed at the image display element 4 is magnification-projected at the projection optical system LN, toward a screen surface SC. Specifically, the image displayed on the image display surface IM2 of the image display element 4 is turned into the intermediate image IM1 at the second optical system LN2, and thereafter, magnification projection of the image is performed at the first optical system LN1, onto the screen surface SC.

As described above, the projector PJ includes the image display element 4 for displaying the image, the light source 1, the illumination optical system 2 that guides the light from the light source 1 toward the image display element 4, and the projection optical system LN that performs magnification projection of the image displayed on the image display element 4 onto the screen surface SC. Still, the projector PJ to which the projection optical system LN is applicable is not limited to this configuration. For example, application of an image display element in which an image is displayed by light emission of the image display surface IM2 itself would achieve a configuration without using illumination. In this case, it is possible to configure the projector PJ without using the light source 1 or the illumination optical system 2.

Each of the lens groups that move inside the projection optical system LN in order to perform zooming and focusing is correspondingly connected with the actuator 6 that moves the lens group to the magnification side or the reduction side, along the optical axis AX. The actuator 6 is connected with the control unit 5 configured to control movement of the lens groups. Alternatively, the lens group may be moved manually without using the control unit 5 and the actuator 6.

EXAMPLES

Hereinafter, a configuration of the projection optical system on which the embodiments of the present invention are implemented will be described more specifically with reference to construction data, or the like, of each of Examples. Herein, each of Examples 1 to 5 (EX1 to 5) is a numerical-value example that corresponds to each of the above-described first to fifth embodiments. Each of the optical configuration diagrams (FIGS. 1 to 5) representing the first to fifth embodiments illustrates lens cross-sectional shapes, lens arrangement, etc. for each of the corresponding Examples 1 to 5.

The construction data for each of Examples indicate, as surface data, in the order from a field on the left side, a surface number i, a curvature radius r (mm), an on-axis surface interval d (mm), a refraction index nd regarding d-line (wavelength: 587.56 nm), and Abbe number vd regarding the d-line. Herein, SC represents the screen surface, ST represents the aperture stop, IM1 represents the intermediate image surface, and IM2 represents the image display surface.

Various types of data for Examples 1 to 4 include a zooming (zoom ratio, magnification change rate). In addition, individual focal length conditions of W (Wide), M (Middle), and T (Tele) include: focal length of the entire system (Fl, mm), F-number (Fno.), a half angle of view (ω, °), an image height (ymax, mm), entire length of the lens (TL, mm), back focus (BF, mm) for the entire system, and variable surface interval (di, i: surface number, mm). Zoom lens group data includes the focal length (mm) of each of the lens groups. Various types of data for Example 5 include the focal length (Fl, mm), F-number (Fno.), a half angle of view (ω, °), an image height (ymax, mm), an entire length of the lens (TL, mm), back focus (BF, mm), of the entire system, and a focal length (Ff, Fr; mm) of the first and second optical systems LN1 and LN2. Note that the back focus BF is represented as a distance from the lens last surface to the paraxial image surface, in an air-equivalent length. The entire length of the lens TL is obtained by adding the back focus BF to the distance from the lens first surface to the lens last surface. The image height ymax corresponds to half of a diagonal length of the image display surface IM2.

Table 1 illustrates values for conditional expressions and related data for each of Examples. Conditional expression-related data are, for example, a maximum half angle of view (ωmax, °), the focal length (Ff, mm) of the first optical system LN1, the focal length (Fr, mm) of the second optical system LN2, the focal length (Fw, mm) of the entire system, a distance (Lf, mm) on the optical axis AX from a most-magnification-side surface vertex in the first optical system LN1 to the intermediate image IM1 in the first optical system LN1, the entire length of the lens (Lw, mm), a chief ray height (Y', mm) from the optical axis AX on the intermediate image IM1 position of the most off-axis beam at a maximum angle of view ωmax, a maximum image height (Y: ymax, mm) on the image display surface IM2, and paraxial magnification (β2) of the second optical system LN2, at the maximum angle of view ωmax.

FIGS. 6A to 9I are distortion diagrams (longitudinal aberration diagrams in an infinity focusing state) corresponding to Examples 1 to 4 (EX1 to EX4), respectively. Specifically, FIGS. 6A to 6C, 7A to 7C, 8A to 8C, and 9A to 9C indicate various types of aberration at the wide angle end (W), FIGS. 6D to 6F, 7D to 7F, 8D to 8F, and 9D to 9F indicate various types of aberration at an intermediate focal length state M, and FIGS. 6G to 6I, 7G to 7I, 8G to 8I, and 9G to 9I indicate various types of aberration at the telephoto end (T). In FIGS. 6A to 9I, each of FIGS. 6A, 6D, 6G, 7A, 7D, 7G, 8A, 8D, 8G, 9A, 9D, and 9G indicates a spherical aberration diagram. Each of FIGS. 6B, 6E, 6H, 7B, 7E, 7H, 8B, 8E, 8H, 9B, 9E, and 9H indicates an astigmatism diagram. Each of FIGS. 6C, 6F, 6I, 7C, 7F, 7I, 8C, 8F, 8I, 9C, 9F, and 9I indicates a distortion aberration diagram. FIGS. 10A to 10C are distortion diagrams (longitudinal aberration diagram in an infinity focusing state) corresponding to Example 5 (EX5). Specifically, FIG. 10A represents a spherical aberration diagram, FIG. 10B represents an astigmatism diagram, and FIG. 10C represents a distortion aberration diagram.

The spherical aberration diagram represents a spherical aberration amount with respect to the d-line (wavelength: 587.56 nm) illustrated in a solid line, a spherical aberration amount with respect to the C-line (wavelength: 656.28 nm) illustrated in a one-dot chain line, and a spherical aberration amount with respect to the g-line (wavelength: 435.84 nm) illustrated in a broken line, respectively, as an individual shift amount (unit: mm) from the paraxial image surface in the optical axis AX direction. In the diagram, the vertical line represents a value normalized from the incident height toward the pupil with the maximum height thereof (namely, relative pupil height). In the astigmatism diagram, the broken line T represents a tangential image surface with respect to the d-line, the solid line S represents a sagittal image surface with respect to the d-line, as a shift amount (unit: mm) from the paraxial image surface in the optical axis AX direction. In the diagram, the vertical axis represents an image height (IMG HT, unit: mm). In the distortion aberration diagram, the horizontal axis represents distortion (unit: %) with respect to the d-line, and the vertical axis represents the image height (IMG HT, unit: mm).

Note that in a case where each of the Examples is applied to the projector (e.g. liquid crystal projector) PJ as the projection optical system LN (FIG. 11), the screen surface (surface that receives projection) SC is supposed to be an image surface and the image display surface IM2 (e.g., liquid crystal surface) is supposed to be an object surface. In each of the Example, however, individual systems are assumed to be reduction systems from a viewpoint of optical design, and the screen surface SC is assumed to be an object surface (object), and optical performance is evaluated on the image display surface (reduction-side image surface) IM2 that corresponds to the image surface (image). As it is obvious from obtained optical performance, the projection optical system LN in each of Examples can be suitable applied not only to a projection lens for a projector but also to an imaging lens for an imaging apparatus (for example, video camera and digital camera).

Example 1 unit: mm

Surface data

| i | r | d | nd | vd |
|---|---|---|---|---|
| object (SC) | infinity | infinity | | |
| 1 | 90.156 | 7.600 | 1.69680 | 55.46 |
| 2 | 68.942 | 8.958 | | |
| 3 | 77.372 | 6.300 | 1.80518 | 25.46 |
| 4 | 57.955 | 10.706 | | |
| 5 | 75.518 | 15.482 | 1.83400 | 37.34 |
| 6 | 189.215 | 0.300 | | |
| 7 | 46.826 | 3.600 | 1.95375 | 32.32 |
| 8 | 28.471 | 8.916 | | |
| 9 | 45.662 | 2.200 | 1.91082 | 35.25 |
| 10 | 22.315 | 13.086 | | |
| 11 | −47.332 | 1.700 | 1.80610 | 33.27 |
| 12 | 96.443 | 18.541 | | |
| 13 | −185.734 | 6.284 | 1.72916 | 54.67 |
| 14 | −50.205 | 23.295 | | |
| 15 | 72.913 | 5.079 | 1.80518 | 25.46 |
| 16 | −121.426 | 25.611 | | |
| 17 | −36.074 | 2.000 | 1.90366 | 31.31 |
| 18 | 96.763 | 2.021 | | |
| 19 | 116.400 | 10.344 | 1.43700 | 95.10 |
| 20 | −33.431 | 0.300 | | |
| 21 | 56.049 | 10.256 | 1.43700 | 95.10 |
| 22 | −65.165 | 0.300 | | |
| 23 | 130.344 | 2.100 | 1.90366 | 31.31 |
| 24 | 40.534 | 1.933 | | |
| 25 | 38.243 | 12.730 | 1.43700 | 95.10 |
| 26 | −91.524 | 0.300 | | |
| 27 | 55.866 | 8.143 | 1.49700 | 81.61 |
| 28 | −194.707 | 5.800 | | |
| 29 | −42.901 | 2.300 | 1.62004 | 36.30 |
| 30 | 49.126 | 20.624 | | |
| 31 | 153.059 | 9.514 | 1.80518 | 25.46 |
| 32 | −110.889 | 28.879 | | |
| 33 | 45.900 | 10.135 | 1.80518 | 25.46 |
| 34 | 84.076 | 8.021 | | |
| 35 (IM1) | infinity | variable | | |
| 36 | −56.931 | 6.217 | 1.80518 | 25.46 |
| 37 | −38.496 | 3.351 | | |
| 38 | −29.989 | 2.600 | 1.59282 | 68.62 |
| 39 | −4276.234 | 16.378 | | |
| 40 | −156.933 | 10.482 | 1.48749 | 70.44 |
| 41 | −38.163 | variable | | |
| 42 | 19560.343 | 5.284 | 1.90366 | 31.31 |
| 43 | −88.500 | 5.676 | | |
| 44 | −46.639 | 2.400 | 1.80518 | 25.46 |
| 45 | −104.689 | 1.552 | | |
| 46 | −245.541 | 6.925 | 1.51680 | 64.20 |
| 47 | −48.173 | variable | | |
| 48 (ST) | infinity | 6.255 | | |
| 49 | −35.312 | 1.800 | 1.72916 | 54.67 |
| 50 | 137.215 | 19.192 | | |
| 51 | −114.804 | 7.477 | 1.43700 | 95.10 |
| 52 | −43.162 | 0.300 | | |
| 53 | 68.354 | 11.660 | 1.43700 | 95.10 |
| 54 | −66.136 | 0.300 | | |
| 55 | 174.756 | 8.314 | 1.49700 | 81.61 |
| 56 | −77.968 | 4.243 | | |
| 57 | −55.771 | 2.400 | 1.69680 | 55.46 |
| 58 | 65.246 | 2.619 | | |
| 59 | 80.585 | 11.044 | 1.49700 | 81.61 |

-continued unit: mm

| | | | | |
|---|---|---|---|---|
| 60 | −73.270 | variable | | |
| 61 | 89.211 | 6.565 | 1.49700 | 81.61 |
| 62 | 31066.445 | 14.310 | | |
| 63 | infinity | 85.000 | 1.51680 | 64.20 |
| 64 | infinity | 5.000 | | |
| 65 | infinity | 3.000 | 1.48749 | 70.44 |
| 66 | infinity | 1.000 | | |
| 67 | infinity | 0.500 | | |
| image (IM2) | infinity | | | |

Various types of data
zoom ratio 1.26

| | Wide (W) | Middle (M) | Tele (T) |
|---|---|---|---|
| Fl | −13.842 | −15.544 | −17.460 |
| Fno. | 2.422 | 2.500 | 2.597 |
| ω | 50.484 | 47.091 | 43.850 |
| ymax | 16.700 | 16.700 | 16.700 |
| TL | 610.095 | 610.097 | 610.098 |
| BF | 78.905 | 78.907 | 78.908 |
| d35 | 34.762 | 33.700 | 34.093 |
| d41 | 29.825 | 17.159 | 2.000 |
| d47 | 28.215 | 32.565 | 35.606 |
| d60 | 2.000 | 11.378 | 23.102 |

Zoom lens group data

| group (surface) | focal length |
|---|---|
| 1 (1-35) | 22.265 |
| 2 (36-41) | 832.800 |
| 3 (42-47) | 105.175 |
| 4 (48-60) | 132.289 |
| 5 (61-67) | 180.003 |

Example 2 unit: mm

Surface data

| i | r | d | nd | vd |
|---|---|---|---|---|
| object (SC) | infinity | infinity | | |
| 1 | 98.016 | 7.600 | 1.69680 | 55.46 |
| 2 | 66.278 | 20.460 | | |
| 3 | 76.743 | 15.564 | 1.83400 | 37.34 |
| 4 | 165.373 | 0.300 | | |
| 5 | 49.189 | 3.600 | 1.95375 | 32.32 |
| 6 | 29.322 | 9.275 | | |
| 7 | 47.719 | 2.268 | 1.91082 | 35.25 |
| 8 | 22.358 | 13.331 | | |
| 9 | −47.366 | 2.200 | 1.80610 | 33.27 |
| 10 | 80.640 | 18.545 | | |
| 11 | −221.994 | 6.493 | 1.72916 | 54.67 |
| 12 | −49.285 | 25.321 | | |
| 13 | 71.059 | 5.148 | 1.80518 | 25.46 |
| 14 | −130.354 | 24.545 | | |
| 15 | −38.565 | 2.000 | 1.90366 | 31.31 |
| 16 | 81.078 | 1.995 | | |
| 17 | 95.441 | 10.410 | 1.43700 | 95.10 |
| 18 | −35.162 | 0.300 | | |
| 19 | 54.081 | 10.200 | 1.43700 | 95.10 |
| 20 | −66.043 | 0.300 | | |
| 21 | 141.071 | 2.100 | 1.90366 | 31.31 |
| 22 | 40.441 | 1.887 | | |
| 23 | 37.999 | 12.742 | 1.43700 | 95.10 |
| 24 | −86.935 | 0.300 | | |
| 25 | 60.957 | 7.966 | 1.49700 | 81.61 |
| 26 | −146.956 | 5.531 | | |
| 27 | −41.372 | 2.300 | 1.62004 | 36.30 |
| 28 | 47.827 | 20.088 | | |

-continued unit: mm

| | | | | |
|---|---|---|---|---|
| 29 | 146.201 | 10.309 | 1.80518 | 25.46 |
| 30 | −104.508 | 30.673 | | |
| 31 | 45.250 | 10.075 | 1.80518 | 25.46 |
| 32 | 79.709 | 8.299 | | |
| 33 (IM1) | infinity | variable | | |
| 34 | −57.432 | 6.167 | 1.80518 | 25.46 |
| 35 | −38.735 | 3.444 | | |
| 36 | −29.772 | 2.441 | 1.59282 | 68.62 |
| 37 | −8921.060 | 16.534 | | |
| 38 | −156.608 | 10.454 | 1.48749 | 70.44 |
| 39 | −37.932 | variable | | |
| 40 | −859.442 | 5.266 | 1.90366 | 31.31 |
| 41 | −81.849 | 5.289 | | |
| 42 | −46.231 | 2.400 | 1.80518 | 25.46 |
| 43 | −101.611 | 3.254 | | |
| 44 | −364.986 | 7.097 | 1.51680 | 64.20 |
| 45 | −49.543 | variable | | |
| 46 (ST) | infinity | 6.721 | | |
| 47 | −35.421 | 1.300 | 1.72916 | 54.67 |
| 48 | 141.441 | 19.326 | | |
| 49 | −120.382 | 7.443 | 1.43700 | 95.10 |
| 50 | −43.995 | 0.300 | | |
| 51 | 69.854 | 11.444 | 1.43700 | 95.10 |
| 52 | −66.691 | 0.300 | | |
| 53 | 185.279 | 8.152 | 1.49700 | 81.61 |
| 54 | −78.804 | 4.189 | | |
| 55 | −56.876 | 2.400 | 1.69680 | 55.46 |
| 56 | 66.695 | 2.642 | | |
| 57 | 83.143 | 10.893 | 1.49700 | 81.61 |
| 58 | −73.489 | variable | | |
| 59 | 89.563 | 6.606 | 1.49700 | 81.61 |
| 60 | −6373.246 | 14.300 | | |
| 61 | infinity | 85.000 | 1.51680 | 64.20 |
| 62 | infinity | 5.000 | | |
| 63 | infinity | 3.000 | 1.48749 | 70.44 |
| 64 | infinity | 1.000 | | |
| 65 | infinity | 0.500 | | |
| image (IM2) | infinity | | | |

Various types of data
zoom ratio 1.26

| | Wide (W) | Middle (M) | Tele (T) |
|---|---|---|---|
| Fl | −13.842 | −15.441 | −17.460 |
| Fno. | 2.425 | 2.500 | 2.605 |
| ω | 50.547 | 47.342 | 43.906 |
| ymax | 16.700 | 16.700 | 16.700 |
| TL | 610.098 | 610.100 | 610.102 |
| BF | 78.898 | 78.900 | 78.902 |
| d33 | 34.784 | 33.658 | 34.084 |
| d39 | 29.580 | 17.929 | 2.000 |
| d45 | 28.649 | 32.403 | 35.267 |
| d58 | 2.000 | 11.025 | 23.663 |

Zoom lens group data

| group (surface) | focal length |
|---|---|
| 1 (1-33) | 22.133 |
| 2 (34-39) | 890.112 |
| 3 (40-45) | 103.122 |
| 4 (46-58) | 138.956 |
| 5 (59-65) | 177.771 |

Example 3 unit: mm

Surface data

| i | r | d | nd | vd |
|---|---|---|---|---|
| object (SC) | infinity | infinity | | |
| 1 | 113.972 | 7.600 | 1.69680 | 55.46 |
| 2 | 76.145 | 12.915 | | |
| 3 | 96.113 | 17.344 | 1.74330 | 49.22 |
| 4 | 237.926 | 0.300 | | |
| 5 | 59.857 | 4.600 | 1.80518 | 25.46 |
| 6 | 42.528 | 8.660 | | |
| 7 | 39.328 | 3.100 | 1.95375 | 32.32 |
| 8 | 28.136 | 8.267 | | |
| 9 | 41.274 | 2.200 | 1.91082 | 35.25 |
| 10 | 21.795 | 13.469 | | |
| 11 | −43.567 | 1.902 | 1.80610 | 33.27 |
| 12 | 86.822 | 17.143 | | |
| 13 | −221.976 | 6.680 | 1.72916 | 54.67 |
| 14 | −47.580 | 22.574 | | |
| 15 | 73.778 | 5.069 | 1.80518 | 25.46 |
| 16 | −123.734 | 26.245 | | |
| 17 | −36.482 | 1.976 | 1.90366 | 31.31 |
| 18 | 94.586 | 2.000 | | |
| 19 | 112.160 | 10.045 | 1.43700 | 95.10 |
| 20 | −32.510 | 0.300 | | |
| 21 | 53.640 | 9.904 | 1.43700 | 95.10 |
| 22 | −68.070 | 0.300 | | |
| 23 | 120.981 | 2.100 | 1.90366 | 31.31 |
| 24 | 39.714 | 2.130 | | |
| 25 | 38.063 | 12.104 | 1.43700 | 95.10 |
| 26 | −100.000 | 0.300 | | |
| 27 | 56.070 | 7.645 | 1.49700 | 81.61 |
| 28 | −221.973 | 5.436 | | |
| 29 | −44.497 | 2.067 | 1.62004 | 36.30 |
| 30 | 47.674 | 18.882 | | |
| 31 | 137.809 | 9.249 | 1.80518 | 25.46 |
| 32 | −114.764 | 29.928 | | |
| 33 | 44.973 | 9.898 | 1.80518 | 25.46 |
| 34 | 77.388 | 8.418 | | |
| 35 (IM1) | infinity | variable | | |
| 36 | −62.065 | 6.379 | 1.80518 | 25.46 |
| 37 | −39.732 | 3.310 | | |
| 38 | −31.055 | 2.600 | 1.59282 | 68.62 |
| 39 | −600.834 | 18.382 | | |
| 40 | −122.509 | 9.720 | 1.48749 | 70.44 |
| 41 | −38.985 | variable | | |
| 42 | 3001.226 | 6.318 | 1.90366 | 31.31 |
| 43 | −94.610 | 9.768 | | |
| 44 | −47.863 | 2.240 | 1.80518 | 25.46 |
| 45 | −110.745 | 3.400 | | |
| 46 | −333.913 | 5.982 | 1.51680 | 64.20 |
| 47 | −49.306 | variable | | |
| 48 (ST) | infinity | 8.835 | | |
| 49 | −36.446 | 1.773 | 1.72916 | 54.67 |
| 50 | 131.300 | 19.199 | | |
| 51 | −206.992 | 7.387 | 1.43700 | 95.10 |
| 52 | −45.301 | 0.300 | | |
| 53 | 67.914 | 10.615 | 1.43700 | 95.10 |
| 54 | −69.606 | 0.521 | | |
| 55 | 223.533 | 7.627 | 1.49700 | 81.61 |
| 56 | −80.914 | 4.105 | | |
| 57 | −58.217 | 2.400 | 1.69680 | 55.46 |
| 58 | 66.014 | 2.682 | | |
| 59 | 84.544 | 10.007 | 1.49700 | 81.61 |
| 60 | −76.823 | variable | | |
| 61 | 88.157 | 6.451 | 1.49700 | 81.61 |
| 62 | 17963.435 | 14.316 | | |
| 63 | infinity | 85.000 | 1.51680 | 64.20 |
| 64 | infinity | 5.000 | | |
| 65 | infinity | 3.000 | 1.48749 | 70.44 |
| 66 | infinity | 1.000 | | |
| 67 | infinity | 0.500 | | |
| image (IM2) | infinity | | | |

-continued unit: mm

Various types of data
zoom ratio 1.26

|  | Wide (W) | Middle (M) | Tele (T) |
|---|---|---|---|
| Fl | −13.841 | −15.441 | −17.460 |
| Fno. | 2.428 | 2.500 | 2.620 |
| ω | 50.536 | 47.337 | 43.899 |
| ymax | 16.700 | 16.700 | 16.700 |
| TL | 610.095 | 610.098 | 610.098 |
| BF | 78.911 | 78.914 | 78.914 |
| d35 | 35.815 | 34.835 | 35.182 |
| d41 | 31.055 | 18.980 | 3.046 |
| d47 | 21.560 | 25.799 | 28.941 |
| d60 | 2.000 | 10.816 | 23.262 |

Zoom lens group data

| group (surface) | focal length |
|---|---|
| 1 (1-35) | 22.292 |
| 2 (36-41) | 680.261 |
| 3 (42-47) | 106.844 |
| 4 (48-60) | 140.878 |
| 5 (61-67) | 178.232 |

Example 4 unit: mm

Surface data

| i | r | d | nd | vd |
|---|---|---|---|---|
| object (SC) | infinity | infinity | | |
| 1 | 87.908 | 7.600 | 1.69680 | 55.46 |
| 2 | 68.136 | 10.534 | | |
| 3 | 80.771 | 6.300 | 1.80518 | 25.46 |
| 4 | 54.933 | 11.090 | | |
| 5 | 73.593 | 15.529 | 1.83400 | 37.34 |
| 6 | 213.311 | 0.300 | | |
| 7 | 45.495 | 3.600 | 1.95375 | 32.32 |
| 8 | 27.465 | 8.675 | | |
| 9 | 44.419 | 2.200 | 1.91082 | 35.25 |
| 10 | 22.726 | 12.642 | | |
| 11 | −44.970 | 1.975 | 1.80610 | 33.27 |
| 12 | 103.763 | 18.567 | | |
| 13 | −170.348 | 6.265 | 1.72916 | 54.67 |
| 14 | −48.847 | 23.478 | | |
| 15 | 73.308 | 5.824 | 1.80518 | 25.46 |
| 16 | −121.902 | 25.914 | | |
| 17 | −35.528 | 2.000 | 1.90366 | 31.31 |
| 18 | 101.325 | 1.933 | | |
| 19 | 113.465 | 10.350 | 1.43700 | 95.10 |
| 20 | −32.642 | 0.300 | | |
| 21 | 56.171 | 10.507 | 1.43700 | 95.10 |
| 22 | −68.241 | 0.300 | | |
| 23 | 134.785 | 2.100 | 1.90366 | 31.31 |
| 24 | 40.565 | 1.799 | | |
| 25 | 37.844 | 13.038 | 1.43700 | 95.10 |
| 26 | −96.769 | 0.300 | | |
| 27 | 52.827 | 8.483 | 1.49700 | 81.61 |
| 28 | −198.237 | 5.860 | | |
| 29 | −42.894 | 2.128 | 1.62004 | 36.30 |
| 30 | 48.466 | 20.933 | | |
| 31 | 148.819 | 9.139 | 1.80518 | 25.46 |
| 32 | −121.593 | 28.222 | | |
| 33 | 45.232 | 9.408 | 1.80518 | 25.46 |
| 34 | 86.031 | 8.012 | | |
| 35 (IM1) | infinity | variable | | |
| 36 | −54.576 | 6.148 | 1.80518 | 25.46 |
| 37 | −38.127 | 3.315 | | |
| 38 | −29.907 | 2.100 | 1.59282 | 68.62 |
| 39 | −3847.891 | 16.126 | | |
| 40 | −148.818 | 10.220 | 1.48749 | 70.44 |
| 41 | −37.467 | variable | | |
| 42 | 722.907 | 4.913 | 1.90366 | 31.31 |
| 43 | −116.544 | 6.385 | | |
| 44 | −51.529 | 1.900 | 1.80518 | 25.46 |
| 45 | −107.942 | 1.037 | | |
| 46 | −304.267 | 5.523 | 1.51680 | 64.20 |
| 47 | −53.293 | variable | | |
| 48 (ST) | infinity | 6.637 | | |
| 49 | −38.573 | 1.327 | 1.72916 | 54.67 |
| 50 | 121.786 | 19.246 | | |
| 51 | −109.693 | 7.364 | 1.43700 | 95.10 |
| 52 | −43.670 | 0.300 | | |
| 53 | 67.404 | 11.494 | 1.43700 | 95.10 |
| 54 | −70.869 | 0.567 | | |
| 55 | 145.377 | 8.862 | 1.49700 | 81.61 |
| 56 | −77.959 | 4.462 | | |
| 57 | −56.429 | 2.400 | 1.69680 | 55.46 |
| 58 | 64.495 | 2.658 | | |
| 59 | 80.134 | 11.186 | 1.49700 | 81.61 |
| 60 | −72.316 | variable | | |
| 61 | 89.450 | 6.650 | 1.49700 | 81.61 |
| 62 | 2595.869 | 14.450 | | |
| 63 | infinity | 85.000 | 1.51680 | 64.20 |
| 64 | infinity | 5.000 | | |
| 65 | infinity | 3.000 | 1.48749 | 70.44 |
| 66 | infinity | 1.000 | | |
| 67 | infinity | 0.500 | | |
| image (IM2) | infinity | | | |

Various types of data
zoom ratio 1.26

|  | Wide (W) | Middle (M) | Tele (T) |
|---|---|---|---|
| Fl | −13.842 | −15.441 | −17.460 |
| Fno. | 2.429 | 2.500 | 2.604 |
| ω | 50.416 | 47.310 | 43.922 |
| ymax | 16.700 | 16.700 | 16.700 |
| TL | 610.102 | 610.107 | 610.104 |
| BF | 79.053 | 79.057 | 79.055 |
| d35 | 33.852 | 33.852 | 33.852 |
| d41 | 31.384 | 17.501 | 2.000 |
| d47 | 27.611 | 32.857 | 35.730 |
| d60 | 2.075 | 10.712 | 23.339 |

Zoom lens group data

| group (surface) | focal length |
|---|---|
| 1 (1-35) | 22.401 |
| 2 (36-41) | 1096.173 |
| 3 (42-47) | 112.213 |
| 4 (48-60) | 123.064 |
| 5 (61-67) | 186.239 |

Example 5 unit: mm

Surface data

| i | r | d | nd | vd |
|---|---|---|---|---|
| object (SC) | infinity | infinity | | |
| 1 | 63.021 | 4.600 | 1.69680 | 55.46 |
| 2 | 47.017 | 6.862 | | |
| 3 | 51.685 | 3.700 | 1.80518 | 25.46 |
| 4 | 38.689 | 10.500 | | |
| 5 | 61.270 | 10.834 | 1.83400 | 37.34 |
| 6 | 170.131 | 0.300 | | |
| 7 | 43.338 | 2.200 | 1.95375 | 32.32 |

-continued unit: mm

| | | | | |
|---|---|---|---|---|
| 8 | 20.155 | 7.336 | | |
| 9 | 37.612 | 1.600 | 1.91082 | 35.25 |
| 10 | 21.994 | 10.864 | | |
| 11 | −22.916 | 1.400 | 1.80610 | 33.27 |
| 12 | −1482.920 | 3.280 | | |
| 13 | −78.679 | 7.539 | 1.72916 | 54.67 |
| 14 | −26.919 | 11.399 | | |
| 15 | 84.901 | 5.695 | 1.80518 | 25.46 |
| 16 | −64.979 | 27.030 | | |
| 17 | −32.550 | 2.000 | 1.90366 | 31.31 |
| 18 | 106.035 | 2.406 | | |
| 19 | 217.315 | 10.242 | 1.43700 | 95.10 |
| 20 | −28.539 | 0.300 | | |
| 21 | 75.797 | 11.706 | 1.43700 | 95.10 |
| 22 | −48.765 | 0.300 | | |
| 23 | 174.439 | 2.100 | 1.90366 | 31.31 |
| 24 | 49.375 | 1.261 | | |
| 25 | 41.836 | 14.472 | 1.43700 | 95.10 |
| 26 | −74.750 | 0.300 | | |
| 27 | 83.098 | 7.532 | 1.49700 | 81.61 |
| 28 | −173.871 | 6.520 | | |

-continued unit: mm

| | | | | |
|---|---|---|---|---|
| 29 | −42.107 | 1.833 | 1.62004 | 36.30 |
| 30 | 55.157 | 4.499 | | |
| 31 | 121.601 | 7.763 | 1.80518 | 25.46 |
| 32 | −115.807 | 22.140 | | |
| 33 | 58.256 | 9.051 | 1.80518 | 25.46 |
| 34 | 195.627 | 21.360 | | |
| 35 (IM1) | infinity | 41.801 | | |
| 36 | −62.957 | 7.185 | 1.80518 | 25.46 |
| 37 | −35.672 | 4.264 | | |
| 38 | −27.751 | 2.600 | 1.59282 | 68.62 |
| 39 | 680.906 | 6.318 | | |
| 40 | −78.984 | 12.938 | 1.48749 | 70.44 |
| 41 | −30.032 | 0.300 | | |
| 42 | −310.077 | 5.755 | 1.90366 | 31.31 |
| 43 | −74.326 | 6.279 | | |
| 44 | −38.745 | 2.300 | 1.80518 | 25.46 |
| 45 | −82.914 | 0.300 | | |
| 46 | −659.397 | 8.588 | 1.51680 | 64.20 |
| 47 | −44.718 | 46.990 | | |
| 48 (ST) | infinity | 8.073 | | |
| 49 | −31.064 | 1.800 | 1.72916 | 54.67 |
| 50 | 102.425 | 8.112 | | |
| 51 | −104.634 | 6.061 | 1.43700 | 95.10 |
| 52 | −39.561 | 0.300 | | |
| 53 | 99.883 | 11.521 | 1.43700 | 95.10 |
| 54 | −40.950 | 0.300 | | |
| 55 | 206.244 | 8.745 | 1.49700 | 81.61 |
| 56 | −54.900 | 3.836 | | |

-continued unit: mm

| | | | | |
|---|---|---|---|---|
| 57 | −44.015 | 2.400 | 1.69680 | 55.46 |
| 58 | 66.735 | 3.037 | | |
| 59 | 98.451 | 8.748 | 1.49700 | 81.61 |
| 60 | −93.796 | 0.300 | | |
| 61 | 93.253 | 11.426 | 1.49700 | 81.61 |
| 62 | −65.716 | 14.300 | | |
| 63 | infinity | 85.000 | 1.51680 | 64.20 |
| 64 | infinity | 5.000 | | |
| 65 | infinity | 3.000 | 1.48749 | 70.44 |
| 66 | infinity | 1.000 | | |
| 67 | infinity | 0.500 | | |
| image (IM2) | infinity | | | |

Various types of data

| | |
|---|---|
| Fl | −13.841 |
| Fno. | 2.500 |
| ω | 50.464 |
| ymax | 16.700 |
| TL | 540.092 |
| BF | 78.892 |
| Ff | 19.535 |
| Fr | 96.888 |

TABLE 1

| VALUES FOR CONDITIONAL EXPRESSIONS, etc. | | EXAMPLE 1 | EXAMPLE 2 | EXAMPLE 3 | EXAMPLE 4 | EXAMPLE 5 |
|---|---|---|---|---|---|---|
| | ωmax | 50.484 | 50.547 | 50.536 | 50.416 | 50.464 |
| (1) | Ff/|Fw| | 1.609 | 1.599 | 1.611 | 1.618 | 1.411 |
| (2) | Lf/Lw | 0.481 | 0.479 | 0.477 | 0.484 | 0.446 |
| (3) | (Y'/Y) × β2 | 0.987 | 0.989 | 0.986 | 0.992 | 0.913 |
| | Ff | 22.265 | 22.133 | 22.292 | 22.401 | 19.535 |
| | Fr | 66.776 | 67.429 | 70.703 | 64.114 | 96.888 |
| | Fw | −13.842 | −13.842 | −13.841 | −13.842 | −13.841 |
| | Lf | 293.356 | 292.124 | 290.749 | 295.306 | 240.923 |
| | Lw | 610.095 | 610.098 | 610.095 | 610.102 | 540.092 |
| | Y' | −26.444 | −26.353 | −26.458 | −26.729 | −21.455 |
| | Y | 16.700 | 16.700 | 16.700 | 16.700 | 16.700 |
| | β2 | −0.623 | −0.627 | −0.623 | −0.619 | −0.711 |

Although the present invention has been described and illustrated in detail, it is clearly understood that the same is by way of illustrated and example only and is not to be taken by way of limitation, the scope of the present invention being interpreted by terms of the appended claims.

What is claimed is:

1. A projection optical system capable of performing magnification projection of an image displayed on an image display surface, with a 40° half angle of view, or more, the projection optical system comprising, in an order from a magnification side:

a first optical system; and
a second optical system,
wherein the second optical system forms an intermediate image of the image,
the first optical system performs magnification projection of the intermediate image, and
the following conditional expressions (1) and (2) are satisfied:

$$1.3 < Ff/|Fw| < 1.7 \qquad (1)$$

$$0.4 < Lf/Lw < 0.6 \qquad (2),$$

where,
Ff: a focal length of the first optical system,
Fw: a focal length of an entire system at a maximum angle of view in a case where the projection optical system is a zoom lens, Lf: a distance on optical axis, from a most-magnification-side surface vertex to the intermediate image, in the first optical system, and Lw: an entire length of a lens, at the maximum angle of view in a case where the projection optical system is a zoom lens.

2. The projection optical system according to claim 1, wherein no asphere is included in three lenses beginning from the most-magnification-side of the first optical system.

3. The projection optical system according to claim 1, wherein no asphere is included in the first optical system.

4. The projection optical system according to claim 1, wherein no asphere is included in the system.

5. The projection optical system according to claim 1, wherein the following conditional expression (3) is satisfied:

$$0.8<(Y'/Y)\times \beta 2<1 \quad (3),$$

where,

Y': a chief ray height from an optical axis on an intermediate image position of a most off-axis beam at a maximum angle of view, Y: a maximum image height on the image display surface, β2: paraxial magnification of a second optical system at the maximum angle of view wherein paraxial magnification is defined as image size at the image display surface divided by intermediate image size.

6. The projection optical system according to claim 1, wherein a most-magnification-side lens of the first optical system is a negative lens.

7. The projection optical system according to claim 1, wherein at least one positive lens exists among three lenses beginning from the most magnification side of the first optical system.

8. The projection optical system according to claim 1, wherein the first optical system includes a negative lens, a negative lens, a positive lens, and a negative lens, in the order from the magnification side.

9. The projection optical system according to claim 1, wherein magnification change is performed by moving, along the optical axis, a lens group including at least a portion of one of the first and second optical systems.

10. The projection optical system according to claim 9, wherein the lens group that moves for magnification change is positioned in the second optical system alone.

11. A projector comprising:

an image display element having the image display surface; and a projection optical system that performs magnification projection of an image displayed on the image display surface, onto a screen surface, the projection optical system comprising:

a second optical system, wherein the second optical system forms an intermediate image of the image, the first optical system performs magnification projection of the intermediate image, and the following conditional expressions (1) and (2) are satisfied:

$$1.3<Ff/|Fw|<1.7 \quad (1)$$

$$0.4<Lf/Lw<0.6 \quad (2),$$

where,

Ff: a focal length of the first optical system,

Fw: a focal length of an entire system at a maximum angle of view in a case where the projection optical system is a zoom lens, Lf: a distance on optical axis, from a most-magnification-side surface vertex to the intermediate image, in the first optical system, and Lw: an entire length of a lens at the maximum angle of view in a case where the projection optical system is a zoom lens.

\* \* \* \* \*